United States Patent [19]
Yoshida

[11] Patent Number: 4,815,121
[45] Date of Patent: Mar. 21, 1989

[54] COMMUNICATION APPARATUS RECOGNIZING SPEECH AND AUTOMATICALLY SWITCHING FROM DATA TO SPEECH TRANSMISSION

[75] Inventor: Takehiro Yoshida, Tokyo, Japan

[73] Assignee: Canon Kabushiki Kaisha, Tokyo, Japan

[21] Appl. No.: 740,491

[22] Filed: Jun. 3, 1985

[30] Foreign Application Priority Data

Jun. 6, 1984 [JP] Japan ................................. 59-114670
Jul. 26, 1984 [JP] Japan ................................. 59-154145
Jul. 30, 1984 [JP] Japan ................................. 59-157349

[51] Int. Cl.⁴ ...................... H04M 1/64; H04M 11/00
[52] U.S. Cl. ......................................... 379/67; 379/88; 379/93; 379/100
[58] Field of Search ...................... 379/88, 67, 79, 81, 379/82, 93, 94, 96, 98, 100, 80, 90

[56] References Cited

U.S. PATENT DOCUMENTS

| | | | |
|---|---|---|---|
| 4,581,484 | 4/1986 | Bendig | 379/67 |
| 4,660,218 | 4/1987 | Hashimoto | 379/93 |
| 4,677,660 | 6/1987 | Yoshida | 379/100 |

FOREIGN PATENT DOCUMENTS

| | | | |
|---|---|---|---|
| 0166393 | 1/1986 | European Pat. Off. | 379/88 |
| 0174062 | 10/1984 | Japan | 379/100 |
| 0181868 | 10/1984 | Japan | 379/88 |
| 0130247 | 7/1985 | Japan | 379/88 |
| 2166624 | 5/1986 | United Kingdom | 379/88 |

*Primary Examiner*—Thomas W. Brown
*Attorney, Agent, or Firm*—Fitzpatrick, Cella, Harper & Scinto

[57] ABSTRACT

A communication apparatus with an auto-communication mechanism for automatically communicating data, a speech communication mechanism for allowing an operator to communicate speech, a selection mechanism for selecting the auto-communication mechanism or the speech communication mechanism to set the communication apparatus in an auto-communication mode or a speech communication mode, a speech presence identification mechanism for detecting a speech sent from a destination station, and speech output mechanism for outputting speech in accordance with an output of the speech detection mechanism when the communication apparatus is in the auto-communication mode.

24 Claims, 28 Drawing Sheets

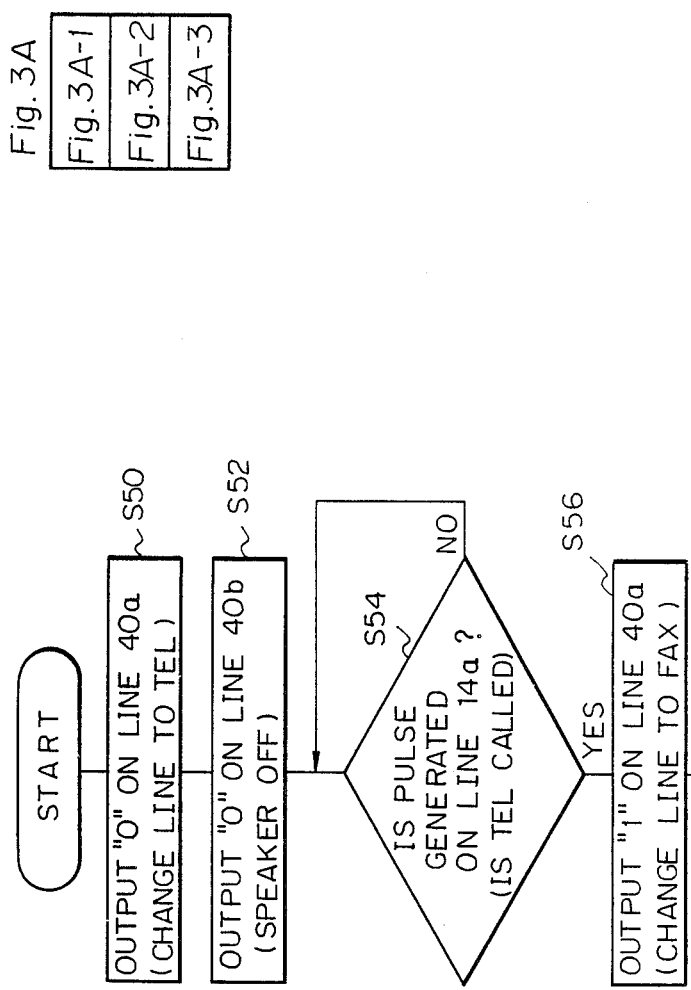

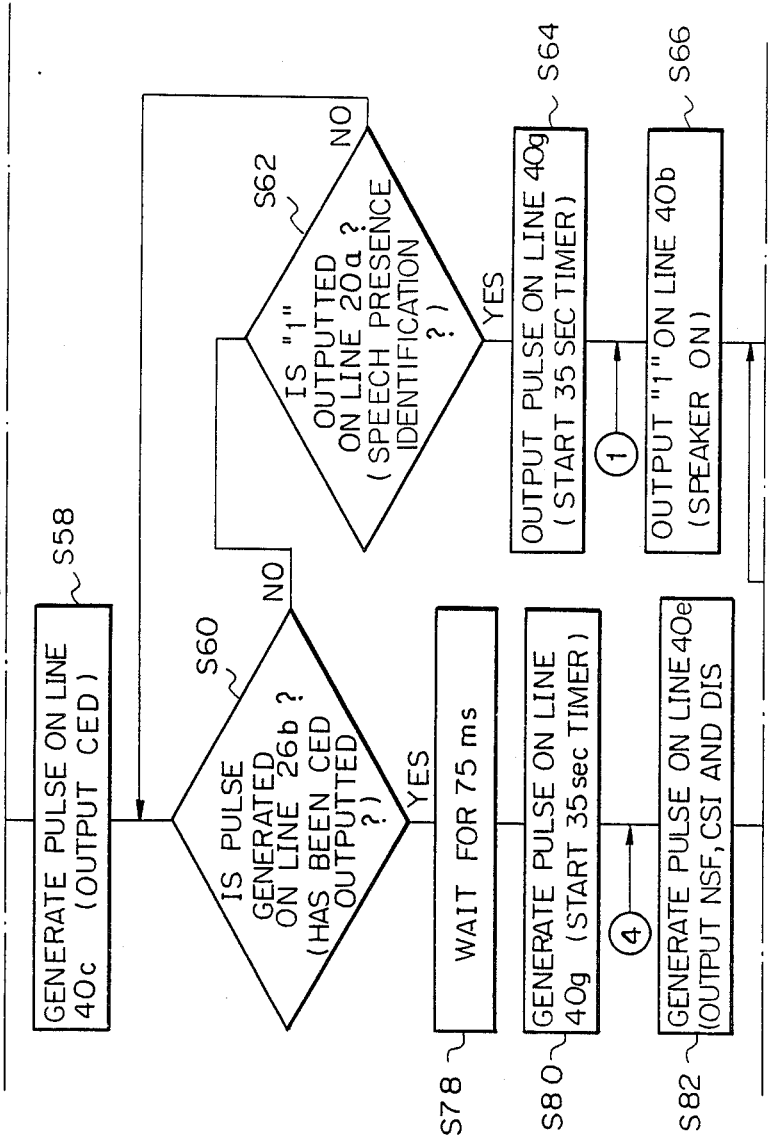

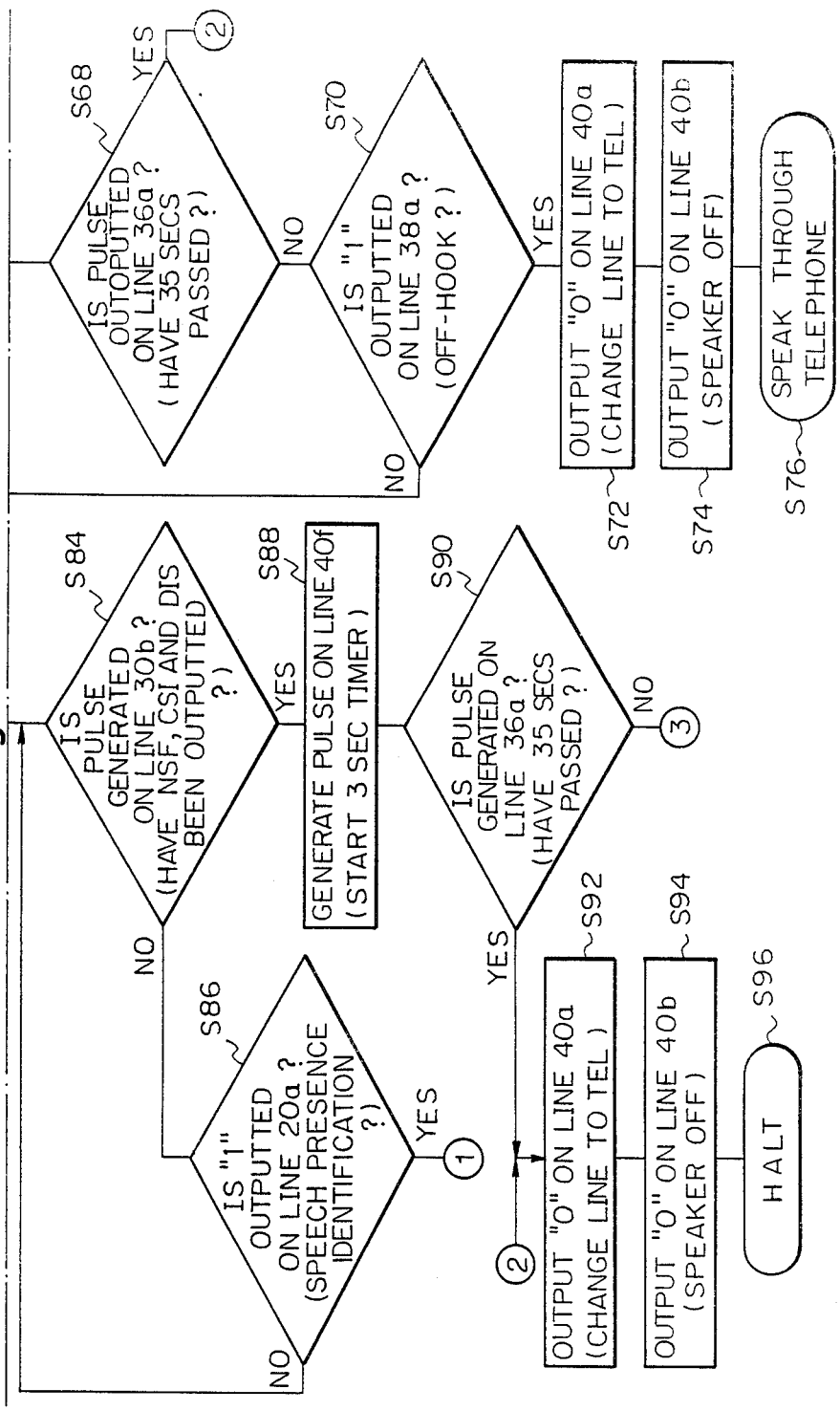

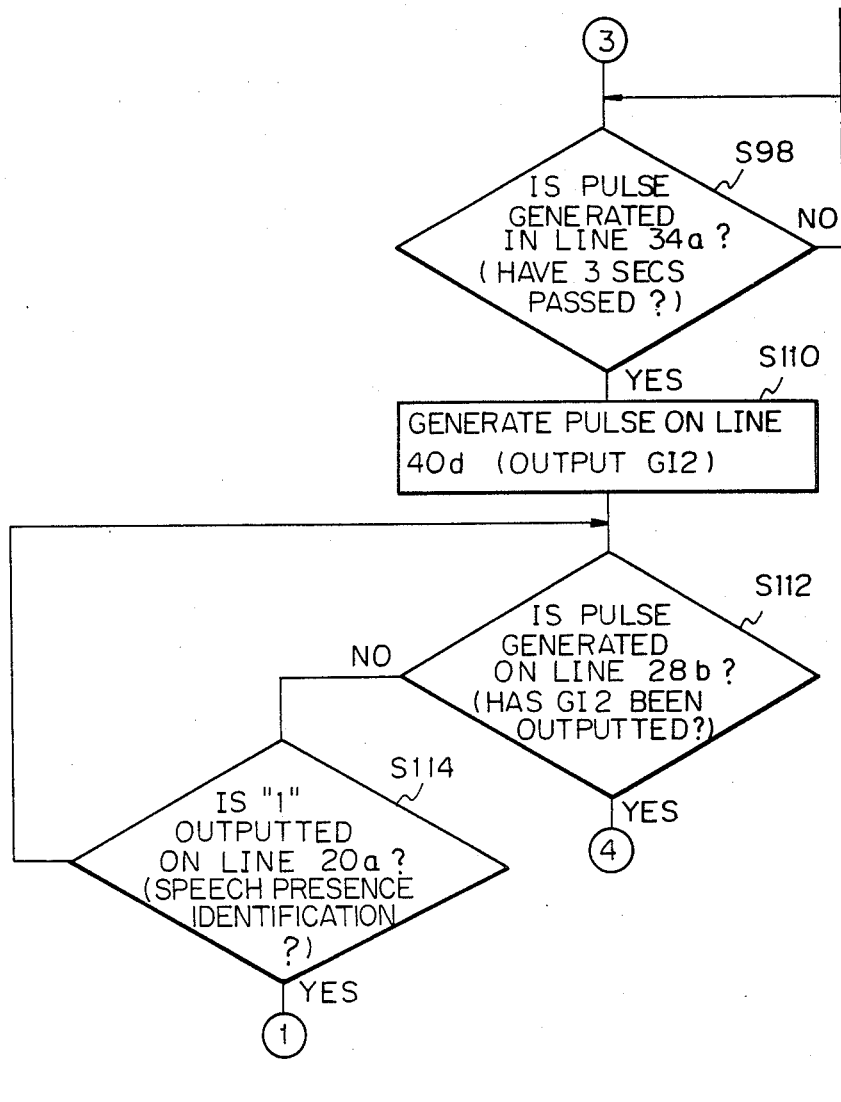

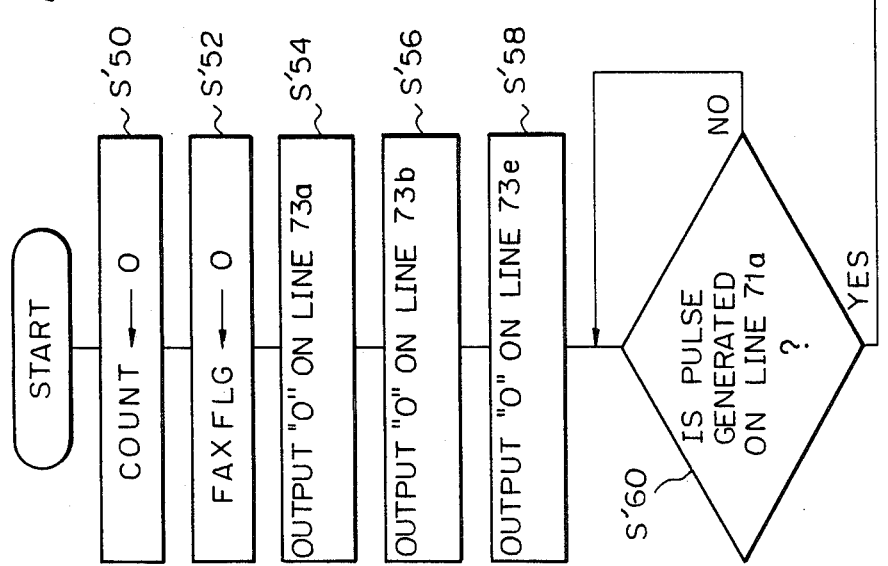

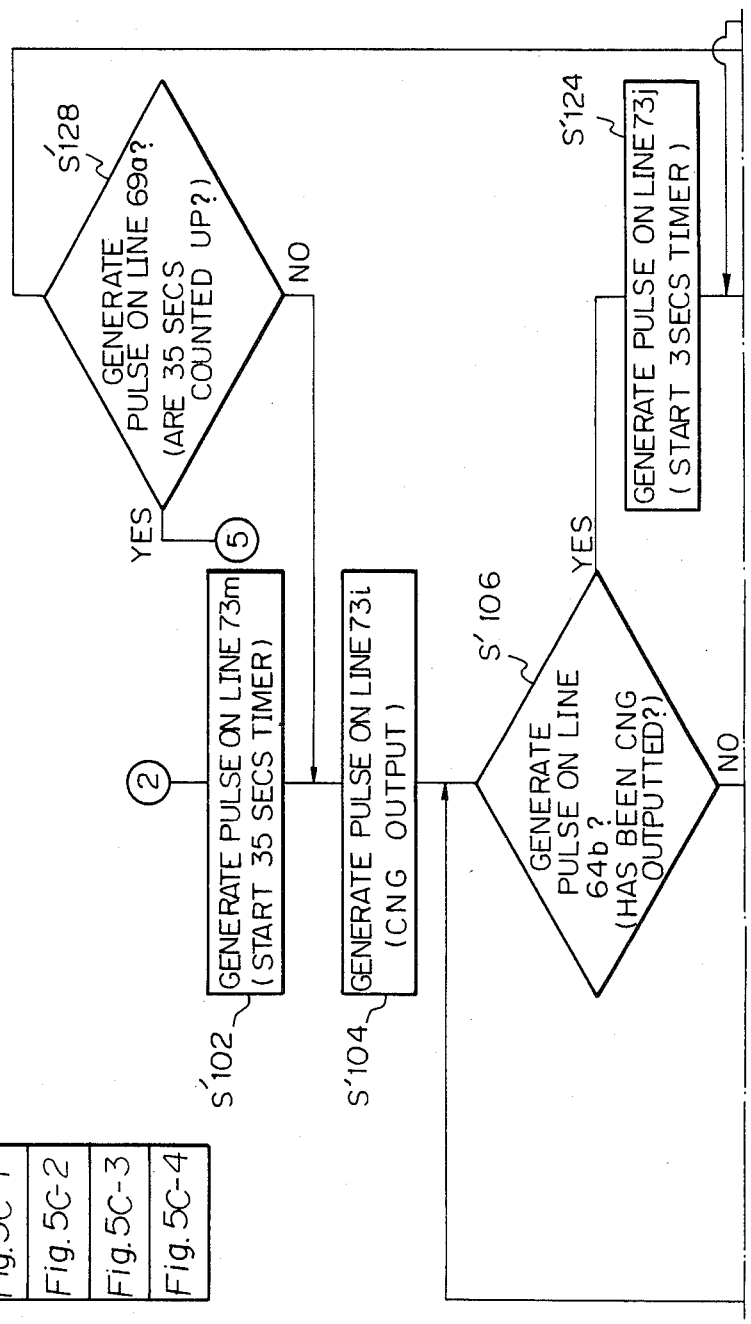

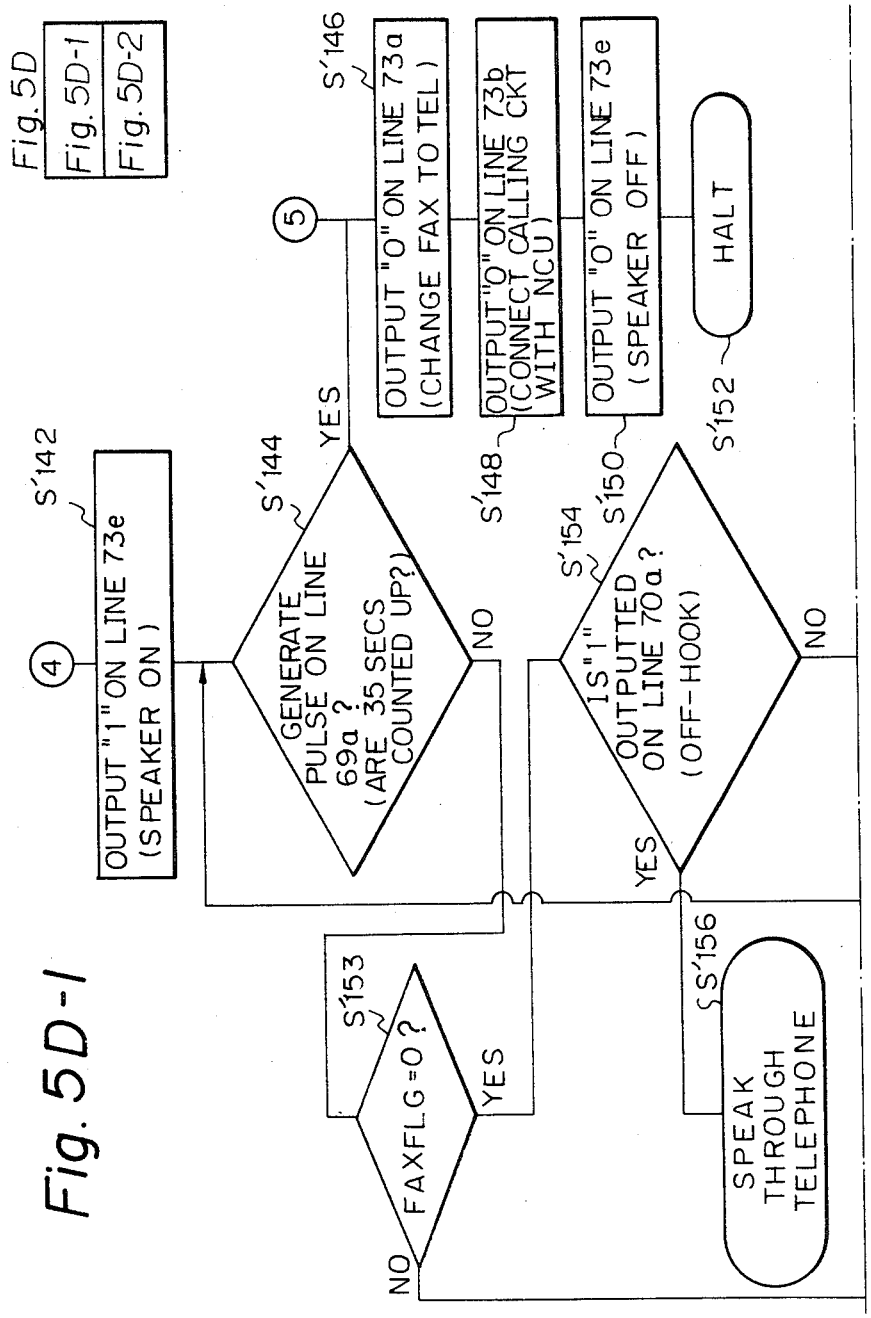

| Fig. 6A | Fig. 6B |

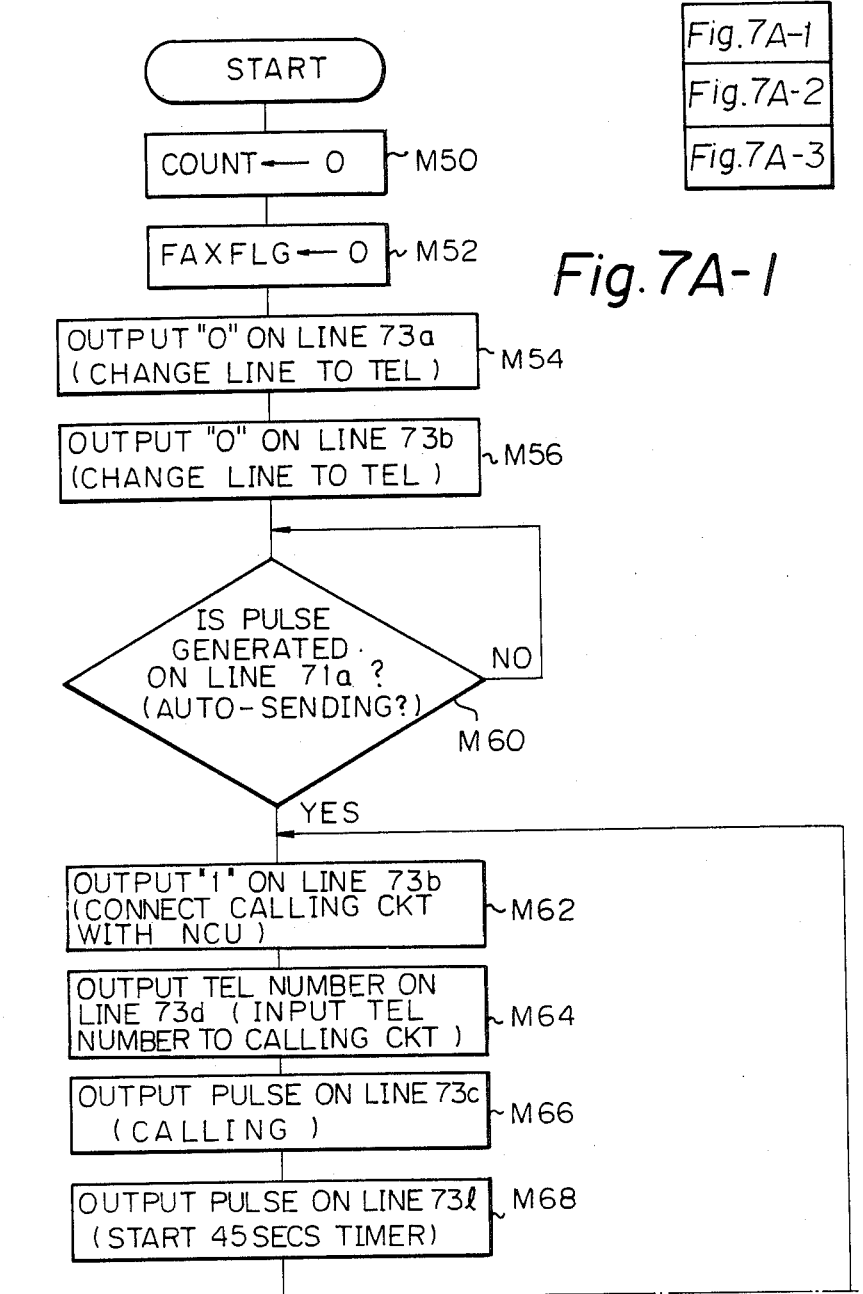

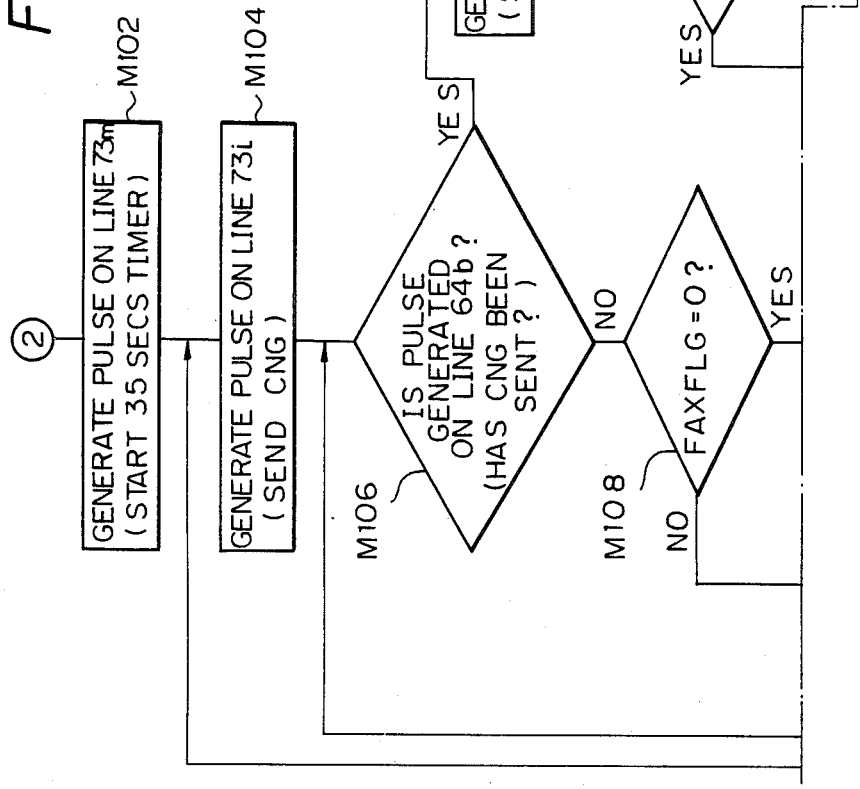

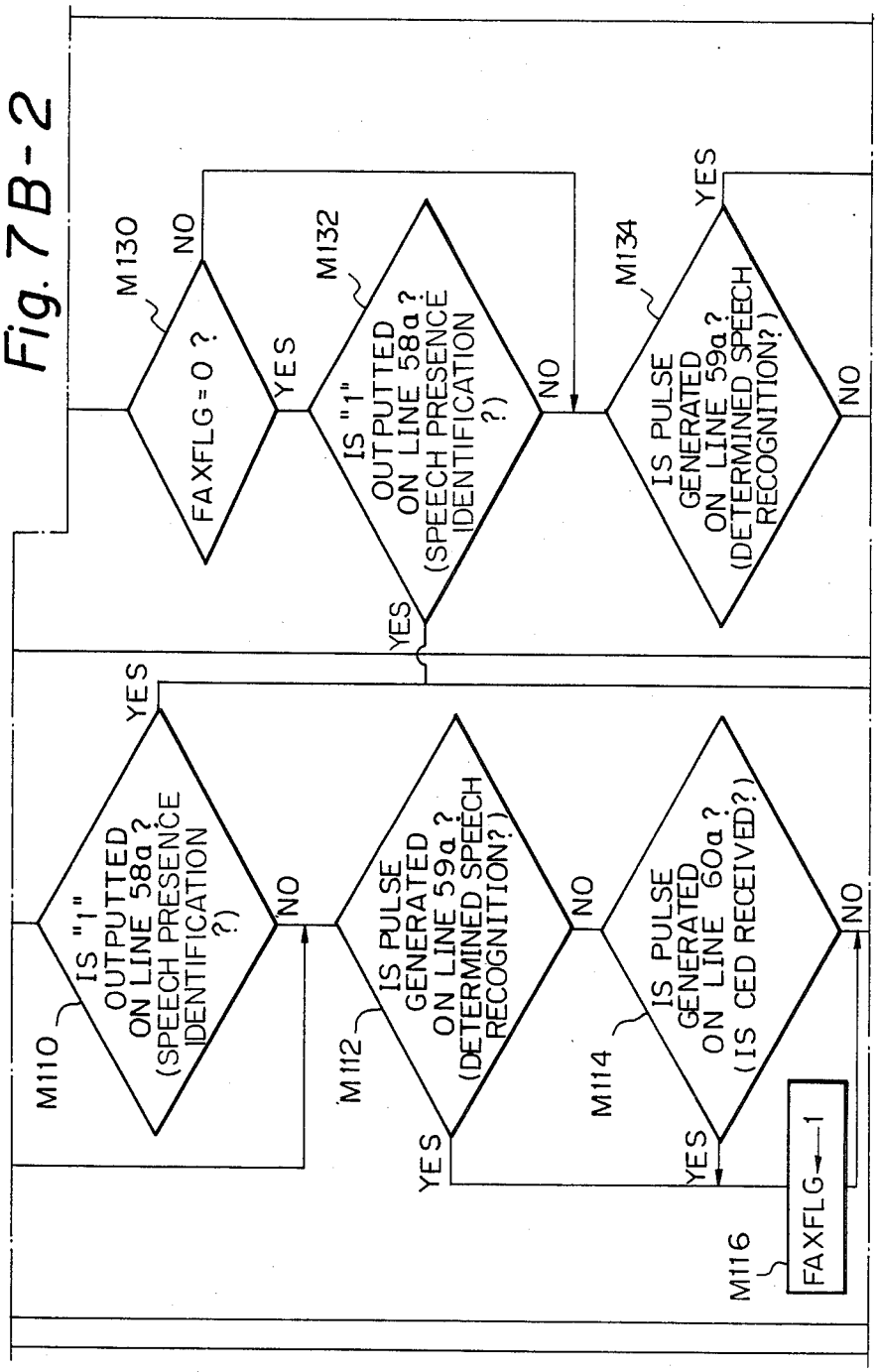

ically terminates from the initial transmission of the NSF, CSI and DIS signals, the receiving facsimile machine determines an error and terminates the connection.

COMMUNICATION APPARATUS RECOGNIZING SPEECH AND AUTOMATICALLY SWITCHING FROM DATA TO SPEECH TRANSMISSION

BACKGROUND OF THE INVENTION

1. Field of the Invention

The present invention relates to a communication apparatus and more particularly to a communication apparatus which has an automatic communication function and effects communication through a telephone line.

2. Description of the Prior Art

A facsimile machine having an automatic communication function to automatically receive a text sent from a calling station or automatically send a text to a called station in response to a call signal from a calling station facsimile machine, has been known.

The facsimile machine having such an automatic communication function usually has a manual receive mode in which the call signal is received by a conventional telephone set and then the line is manually switched to the facsimile machine. The selection of the manual mode and the auto-mode is usually done by a switch mounted on a console panel of the facsimile machine.

In the manual receive mode, the telephone set associated with the facsimile machine may be used in the same manner as a conventional telephone sets and can receive a call even from a public telephone. However, an operator must intervene when a text is to be received. The operator must hook up a handset, depress a receive button and switch the line to the facsimile machine.

In the auto-receive mode, the facsimile machine can automatically receive the text sent from another facsimile machine but the telephone set connected to the facsimile machine has its speech function taken away and cannot receive a call from a public telephone. FIG. 1 illustrates an example. A receiver used is a G2/G3 facsimile machine which meets the CCITT Recommendation T3 and T4.

The facsimile machine in the auto-receive mode sends out a CED (Call Station Identification) signal 1 to a line for a call from a public telephone. Then, the called station facsimile machine sends out NSF (Non-Standard Facilities) signal 2, CSI (Called Subscriber Identification) signal 3 and DIS (Digital Identification Signal) signal 4 to the line. Then, the facsimile machine tries to receive NSS (Non-Standard Facilities Set-up) signal, TSI (Transmitting Subscriber Identification) signal and DCS (Digital Command Signal) signal from the sending station which correspond to the NSF CSI and DIS signals, respectively. However, since the NSS, TSI and DCS signals are not sent out of a conventional telephone set, the receiving station facsimile machine, after a three-second waiting period, sends out GI2 (Group Identification Group 2) signal 5, NSF signal 2, CSI signal 3 and DSI signal 4 to the line.

Then, the facsimile machine tries to receive GC2 signal, NSS signal, TSI signal and DCS signal from the sending station which correspond to GI2, NSF, CSI and DIS signals, respectively. However, since the GC2 (Group Command Group 2) signal, NSS signal, TSI signal and DCS signal are not sent out of the conventional telephone set, the receiving station facsimile machine, after a three-second waiting period, again sends out the GI2, NSF, CSI and DIS signals to the line. After repeating the above steps for 35 second, timed In an auto-send mode in which a preset input is sent to a destination station at a designated time, a significant protocol signal sent from the called station immediately after the call is detected. If the called station facsimile machine is in the manual-receive mode or the line is busy and the significant protocol signal is not detected, the call signal is resent after a predetermined period (e.g. one minute). The redialing is effected at least two times. If the called station facsimile machine is in the manual-receive mode, the operator will respond to the call but because the significant protocol signal is not detected, facsimile communication is not attained.

A user who has only one telephone line usually sets the telephone set to the conventional speech mode and does not set the facsimile machine to the auto-communication mode. Accordingly, the auto-communication function is not effectively used.

This problem is common to other communication apparatus having the auto-communication function such as a personal computer or word processor having a communication function.

SUMMARY OF THE INVENTION

It is an object of the present invention to improve a communication apparatus.

It is another object of the present invention to provide a communication apparatus which can effectively use an auto-communication function.

It is another object of the present invention to provide a communication apparatus which allows effective use of a telephone line for data communication and conventional speech through a telephone set.

It is another object of the present invention to provide a communication apparatus which enables speech through a telephone set or communication irrespective of a mode of a communication apparatus of a partner station.

DETAILED DESCRIPTION OF THE PREFERRED EMBODIMENTS

In the following description of the preferred embodiments, a G2/G3 facsimile machine in accordance with the CCITT Recommendations T3 and T4 is explained.

Figures 2, 3B:
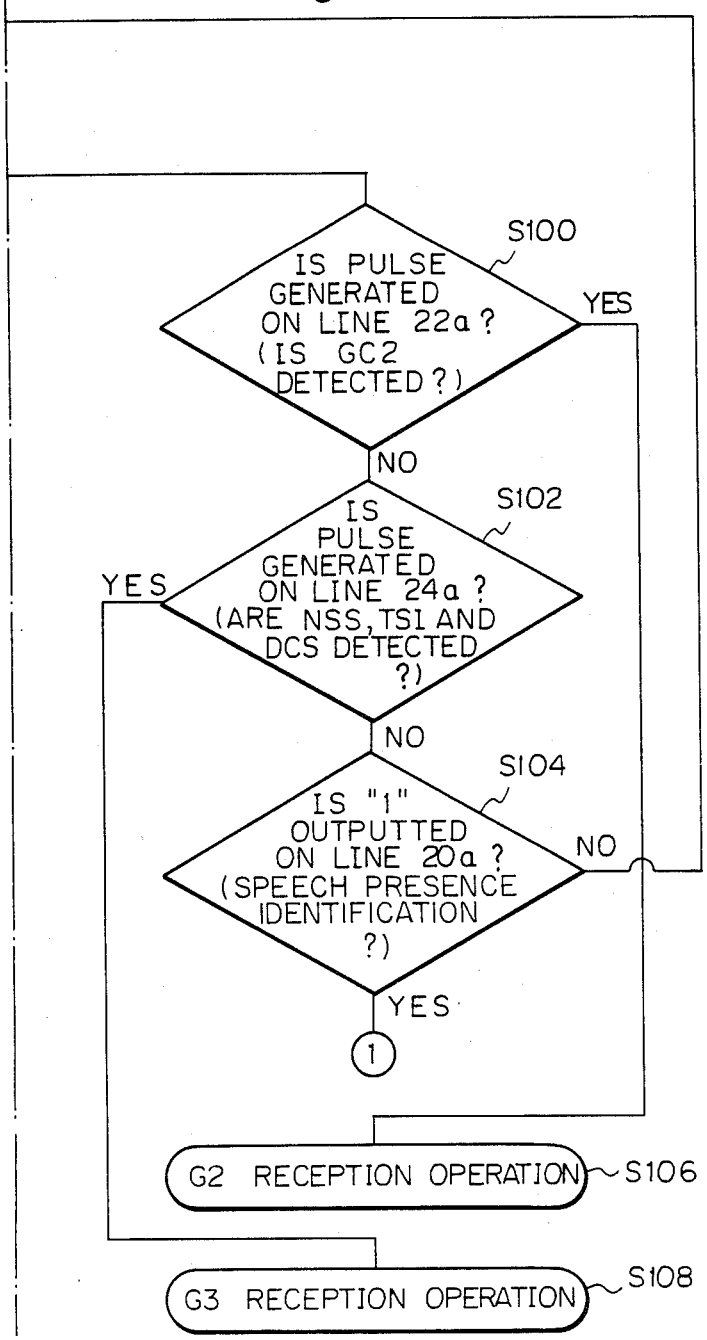

FIG. 2 is a block diagram of a first embodiment of the facsimile machine. Numeral 10 denotes a network control unit (NCU) which is connected to a terminal of a line to control connection of a network so that the network can be used for data communication, switch the terminal to a data communication line or retain a loop. A signal 10a connected to the NCU 10 is a telephone line. A telephone set 12 and a calling signal detection circuit 14 are connected to the NCU 10 through a signal line 10b. The line 10a is normally connected to the signal line 10b through the NCU 10 and a call is received by the telephone set 12. A calling signal is detected by the calling signal detection circuit 14. When it detects the calling signal from a calling station, it produces a pulse on a signal line 14a. The pulse is applied to a control circuit 40.

The connection of the NCU 10 is controlled by the control circuit 40 through a signal line 40a. When a level of the signal line 40a is "0", the NCU 10 connects the line 10a to the signal line 10b. When the level of the signal line 40a is "1", it connects the line 10a to the signal line 10c. A hybrid circuit 16 of the facsimile machine is connected to the signal line 10a.

The hybrid circuit 16 separates a send signal from a receive signal. It transmits an output signal of an adder circuit 32 which combines send signals only to the signal line 10c, and transmits a signal received from the signal line 10c only to a signal line 16a, to which a speaker circuit 18, a speech presence identification circuit 20, GC2 signal detection circuit 22 and NSS, TSI, DCS signal detection circuit 24.

The speaker circuit 18 outputs the received signal as a speech sound when a level of a signal line 40b is rendered "1" by the control circuit 40. The speech presence identification circuit 20 recognizes speech from an operator at the sending station. Once it determines that a speech signal is being received, it sends a "1" signal to the control circuit 40 through a signal line 20a.

The GC2 signal detection circuit 22 detects the GC2 signal from the sending station. When it detects the GC2 signal, it produces a pulse on a signal line 22a.

The detection circuit 24 is of similar construction to that of the detection circuit 22, and it produces a pulse on a signal line 24a when it receives a series of protocol signals NSS, TSI and DCS.

A CED signal send circuit 26, a GI2 signal send circuit 28 and an NSF, CSI, DIS signal send circuit 30 are connected to the adder circuit 32. Those signal send circuits 26, 28 and 30 generate signals of predetermined formats when pulses are applied to signal lines 40c–40e, respectively. The transmission of these protocol signals is controlled by control circuit 40. The signal send circuits produce pulses on the signal lines 26b, 28b and 30b, respectively, when they finish the send-out of the protocol signals.

The control circuit 40 may comprise a microprocessor and a memory and it controls at least the elements shown in FIG. 2 or the entire facsimile machine. Two timer circuits 34 and 36 are connected to the control circuit 40 for a purpose of control to be described later. The timer circuits 34 and 36 start to count three seconds and 35 seconds, respectively, in response to pulses applied to signal lines 40f and 40g by the control circuit 40. When the timer circuits 34 and 36 finish counting, they produce pulses on signal lines 34a and 36a, respectively, to inform the elapse of the time periods to the control circuit 40.

An off-hook detection circuit 38 for detecting a hook position of the telephone set 12 is also connected to the control circuit 40. When the hook is on (the handset is on the hook), a "0" signal is produced on a signal line 38a, and when the hook is off, a "1" signal is produced.

In FIG. 2, only those elements which are pertinent to the present invention are shown, and image signal read, record and transmit/receive units are omitted.

The control operation by the control circuit 40 is now explained.

In the first embodiment, the auto-receive operation is effected in response to the calling signal. When the control circuit 40 detects the calling signal through the calling signal detection circuit 14, it switches the line to the signal line 10c, sends out an initial identification signal and waits for a response from the calling station. The send-out of the signal is continued until the significant protocol signal or speech signal sent from the calling station for 35 seconds is detected. If the significant protocol signal from the calling station is detected, the facsimile communication is carried out. If the speech signal of the operator at the calling station is detected, the facsimile procedure is interrupted and the speech signal is outputted from the speaker circuit 18. The speech output is continued until the off-hook detection circuit 38 detects the off-hook position of the handset of the telephone set 12.

The above operation is explained in detail with reference to flow charts shown in FIGS. 3A and 3B. FIGS. 3A and 3B show an example of control procedure of the control circuit 40.

In a step S50 of FIG. 3A, the control unit 40 produces the "0" signal on the signal line 40a to cause the NCU 10 to switch the line 10a to the telephone set on the signal line 10b. In step S52, it produces the "0" signal on the signal line 40b to inhibit the speech output from the speaker circuit 18. In step S54, it waits for the generation of the pulse on the signal line 14a.

In the wait period, the above loop is repeated, and when the calling signal is sent, the calling signal detection circuit 14 produces the pulse on the signal line 14a. In a step S56, the "1" signal is produced on the signal line 40a to connect the telephone line 10a to the facsimile machine. In a step S58, the pulse is produced on the signal line 40c, that is, the CED signal is sent to the line.

Step S60 checks whether a pulse was produced on the signal line 26b, that is, the CED signal was sent. If the pulse was not produced on the signal line 26b, that is, the CED signal was not sent, a step S62 is executed. If the pulse was produced on the signal line 26b, that is, the CED signal was sent, a step S78 is executed.

Step S62 checks whether the level of the signal line 20a is "1" or not; that is, whether the speech presence identification circuit 20 detected the speech of the operator or not. If the signal level on the signal line 20a is "1" because speech was detected, a step S64 is executed. If the signal level on the signal line 20a is "0" because speech was not detected, the step S60 is again executed.

In the step S64, the pulse is produced on the signal line 40g to start the 35-second timer. In a step S66, the "1" signal is produced on the signal line 40b to cause the speaker circuit 18 to output the speech signal sent from the signal line 16a. Step S68 checks whether the pulse was produced on the signal line 36a because the timer circuit 36 timed out. If the pulse was produced on the signal line 36a, that is, if the timer circuit 36 timed out, a step S92 is executed. If the pulse was not produced on the signal line 36a, that is, if the timer circuit did not time out, a step S70 is executed. The 35-second period is the initial identification period described in the CCITT Recommendation.

Step S70 checks whether the signal level on the signal line 38a is "1". As described earlier signal line 38a transmits a "1" when the operator picked up the handset in response to the speech output. If the signal level on the signal line is "1", that is, if the telephone set 12 is in the off-hook position, a step S72 is executed. If the signal level on the signal line 38a is "0", that is, if the telephone set 12 is in the on-hook position, the step S68 is executed. In the step S72, the "0" signal is produced on the signal line 40a to connect the line 10a to the telephone set 12 to allow speech communication between the operators. In a step S74, the "0" signal is produced on the signal line 40b to stop the speech output by the speaker circuit 18. In a step S76, the speech communication between the operators through the telephone set 12 is effected.

Returning to FIG. 3A-2, if a CED signal generated on line 26b is detected at step S6U, step S78 follows. In step S78 the process in interrupted for 75 ms, corresponding to an interval between the protocol signals. In a step S80, the pulse is produced on the signal line 40g to start the count of the initial identification time. In a step S82, the pulse is produced on the signal line 40e to send out the series of signals NSF, CSI and DIS to the line. Step S84 checks whether pulse was produced on the signal line 30b telling the control circuit that the send-out of the signal was completed. If the pulse was produced on the signal time 30b, that is, if the signals were sent, a step S88 is executed. If the pulse was not produced on the signal line 30b, that is, if the send-out of the signals has not been completed, a step S86 is executed.

Step S86 checks whether the signal level on the signal line 20a is "1" which indicates that speech is being detected. When the signal level on the signal line 20a is "1", that is, when the speech presence identification circuit 20 detects speech, the step S66 is executed. If the signal level on the signal line 20a is "0", that is, if the speech presence identification circuit 20 does not detect the speech, a step S84 is again executed.

In the step S88, the pulse is produced on the signal line 40f to start the 3-second timer circuit 34. Step S90 checks whether the pulse was produced on the signal line 36a. A pulse produced on signal line 36a indicates that the 35-second timer 36 has timed out. If the pulse was produced on the signal line 36a, that is, if the 35-second period elapsed, a step S92 is executed. If the pulse was not produced on the signal line 36a, that is, if the 35-second timer did not time out, a step S98 in FIG. 3B is executed.

In the step S92, the "0" signal is produced on the signal line 40a to connect the line 10a to the telephone set 12. In a step S94, the "0" signal is supplied to the signal line 40b to stop the speech output by the speaker circuit 18, and the operation is stopped in a step S96.

Step S98 of FIG. 3B checks whether a pulse was produced on the signal line 34a indicating that the 3-second timer circuit 34 timed out. If the pulse was produced on the signal line 34a, that is, if the timer circuit 34 timed out, a step S110 is executed. If the pulse was not produced on the signal line 34a, that is, if the 3-second period did not elapse, a step S100 (FIG. 3B-2) is executed.

Step S100 checks whether a pulse was produced on the signal line 22a indicating that the sending station is a G2 machine sending a GC2 signal. If the pulse was produced on the signal line 22a, that is, if the GC2 signal is detected, a step S106 is executed to carry out an image communication in a known G2 mode.

If the pulse was not produced in the signal line 22a, that is, if the GC2 signal is not detected, a step S102 is executed. Step 102 checks whether the pulse was produced on the signal line. Such a signal indicates that the sending station is a G3 machine and sent the NSS, TSI and DCS signals. If the pulse was produced on the signal line 24a, that is, if the NSS, TSI and DCS signals were detected, a step S108 is executed to carry out the image communication in a known G3 mode. If the pulse was not produced on the signal line 14a, that is, if the NSS, TSI and DCS signals were not detected, a step S104 is executed.

Figure 1:
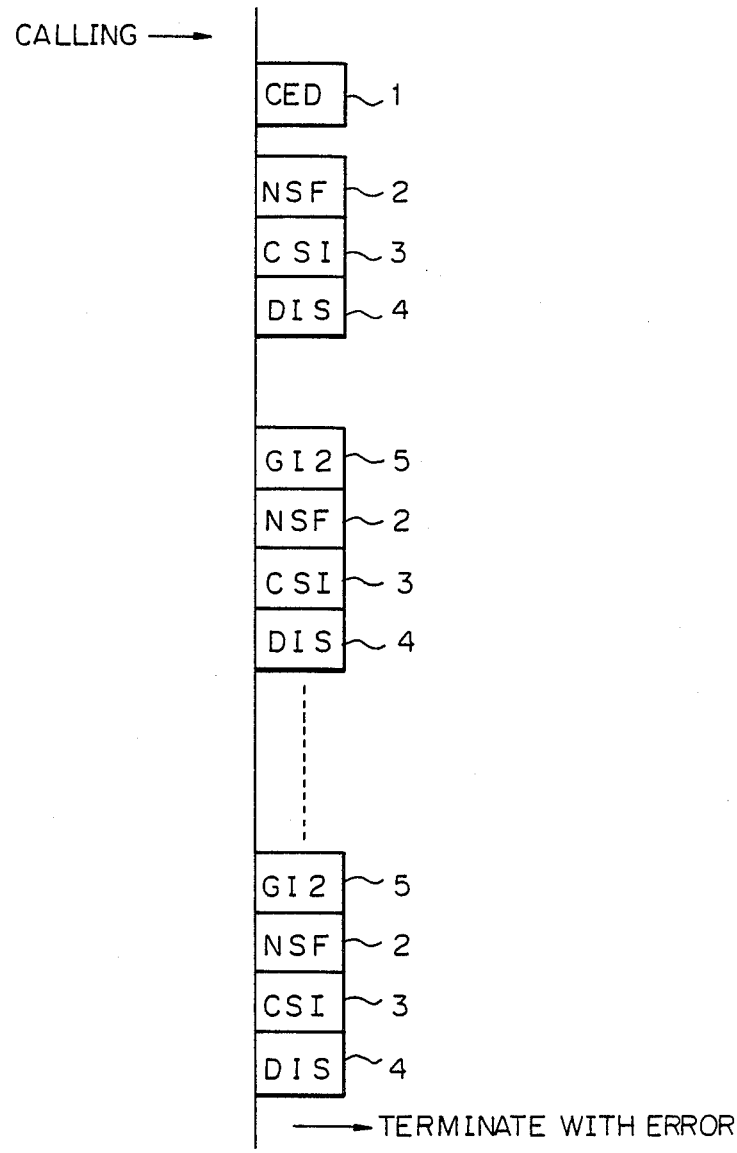
FIG. 1 shows an example of a protocol in a prior art facsimile machine.
Figure 2A:
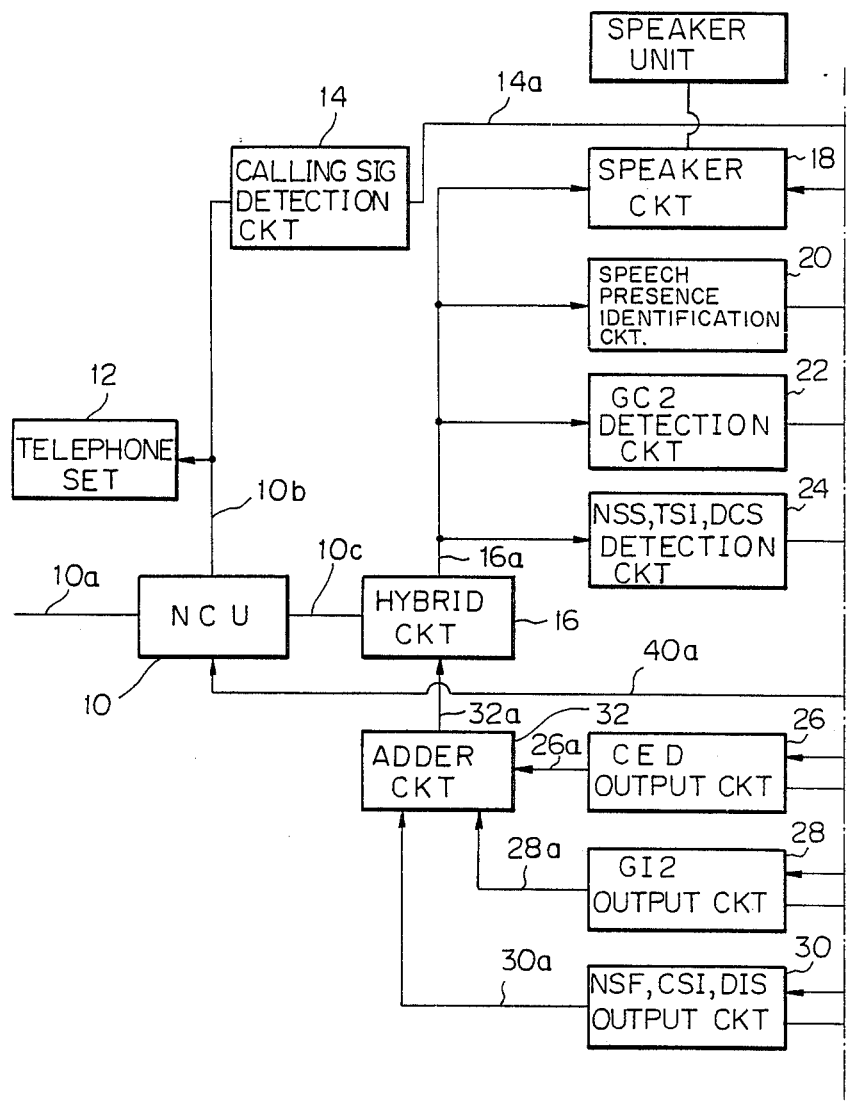
FIG. 2, composed of FIGS. 2A and 2B, is a block diagram of a first embodiment of the present invention, FIG. 3A, composed of FIGS. 3A-1, 3A-2 and 3A-3 and FIG. 3B, composed of FIGS. 3B-1 and 3B-2, show flow charts of control procedures in a control circuit in the first embodiment.
Figure 2B:
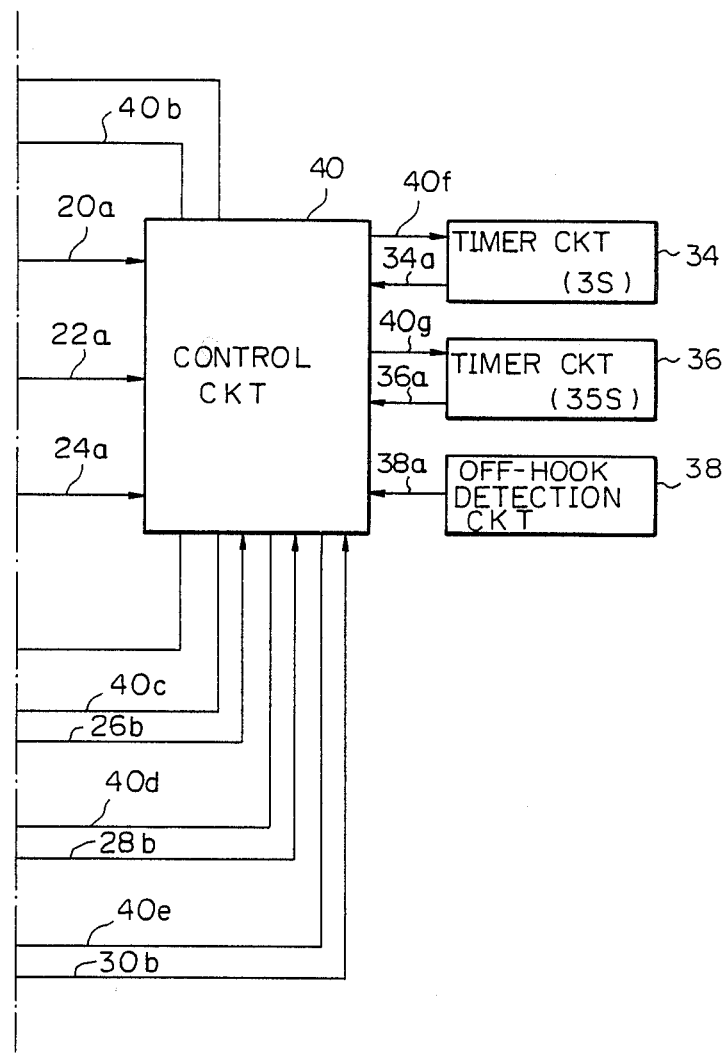

Step S104 checks whether the signal level on the signal line 20a is "1". Such a signal indicates that the presence of speech sent from the sending station is detected. If the signal level on the signal line 20a is "1", that is, if the speech is detected, step S66 in FIG. 3A-2 is executed. If the signal level on the signal line 20a is "0", that is, if the speech is not detected, step S98 (FIG. 3B-1) is again executed.

If the 3-second interval has passed when checked in Step S98, step S110, produces a pulse on the signal line 40d to send the G12 signal to the line. Step S112 then checks whether a pulse was produced on signal line 28b. Such a pulse is the G12 signal. If the pulse was produced on the signal line 28b, that is, if the G12 signal was sent, the step S82 in FIG. 3A-2 is executed. If the pulse was not produced on the signal line 28b, that is, if the G12 signal was not sent, step S114 is executed.

Step S114 checks whether the signal level on the signal line 20a is "1", indicating that speech is detected. If the signal level on the signal line 20a is "1", that is, if the speech is detected, then step S66 (FIG. 3A-2) is executed. If the signal level on signal line 20a is "0", that is, if speech is not detected, step S112 is again executed.

In the first embodiment described above, the protocol signals in the G3 and G2 modes are sent in the initial identification phase and the speech of the operator in the calling station is detected. When a speech signal is detected, it is outputted through a speaker to request the response of the who is receiving the call. The operator can orally communicate with the caller by merely picking up the handset. No special operation is necessary. The speaker output circuit may be replaced by a bell sound circuit to request the response of the operator, although the speech output is easier for recognition.

While the protocol for the G3 and G2 modes have been described in the first embodiment, it can also be applied to other communication modes such as the G1 mode.

A second embodiment allows speech communication or data transmission using the telephone irrespective of the communication mode of the communication apparatus at the sending station. This embodiment is now explained.

Figure 4A:
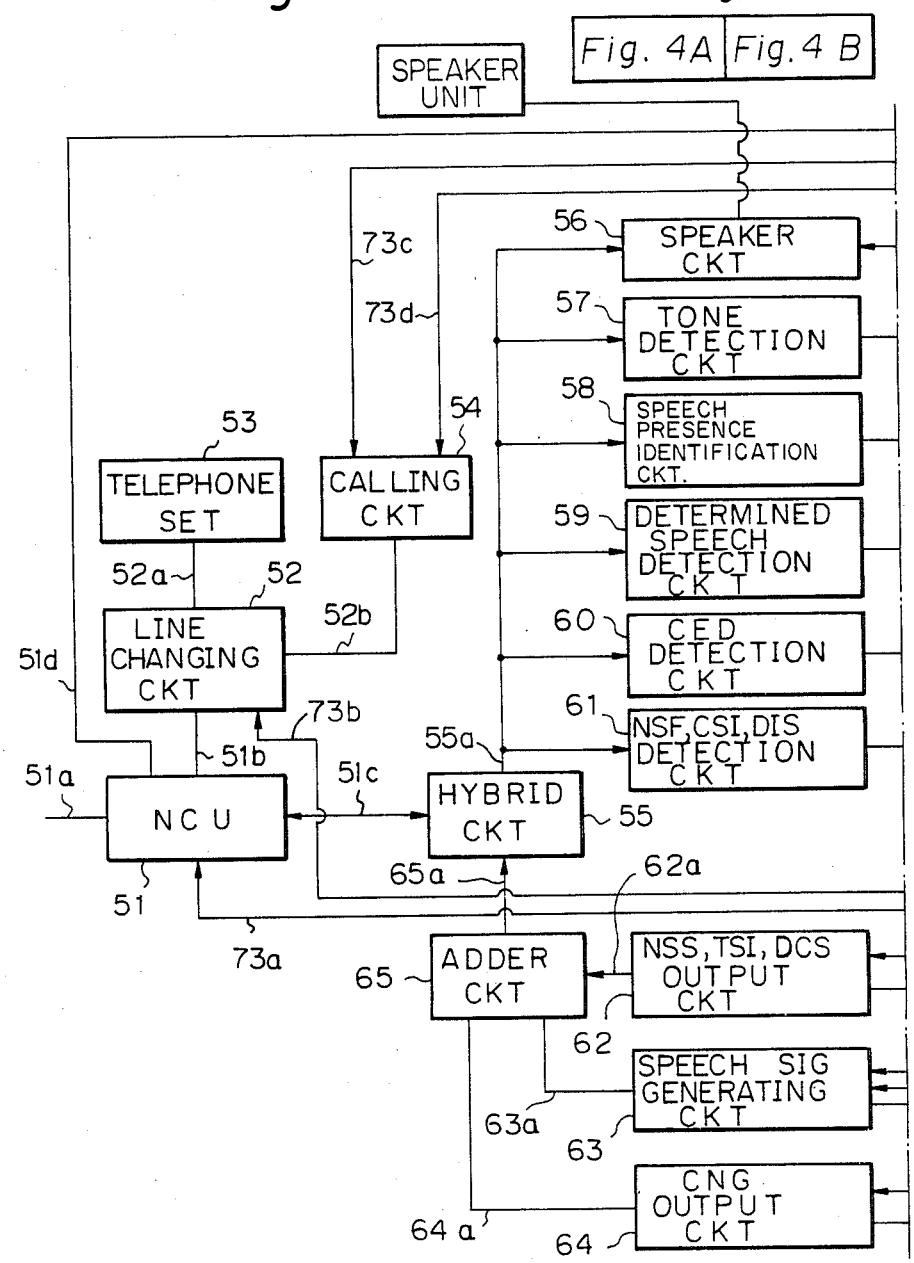
FIG. 4, composed of FIGS. 4A and 4B, is a block diagram of a second embodiment.
Figure 4B:
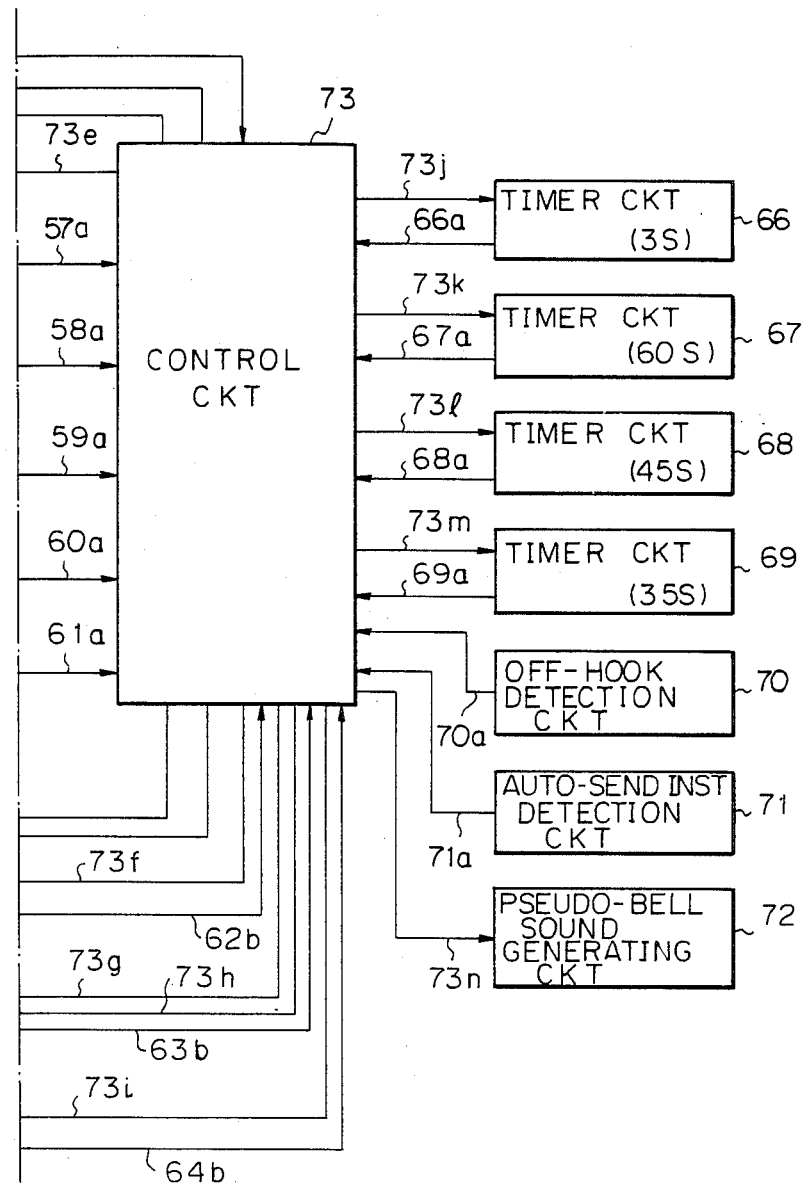
Figures 2, 5A:
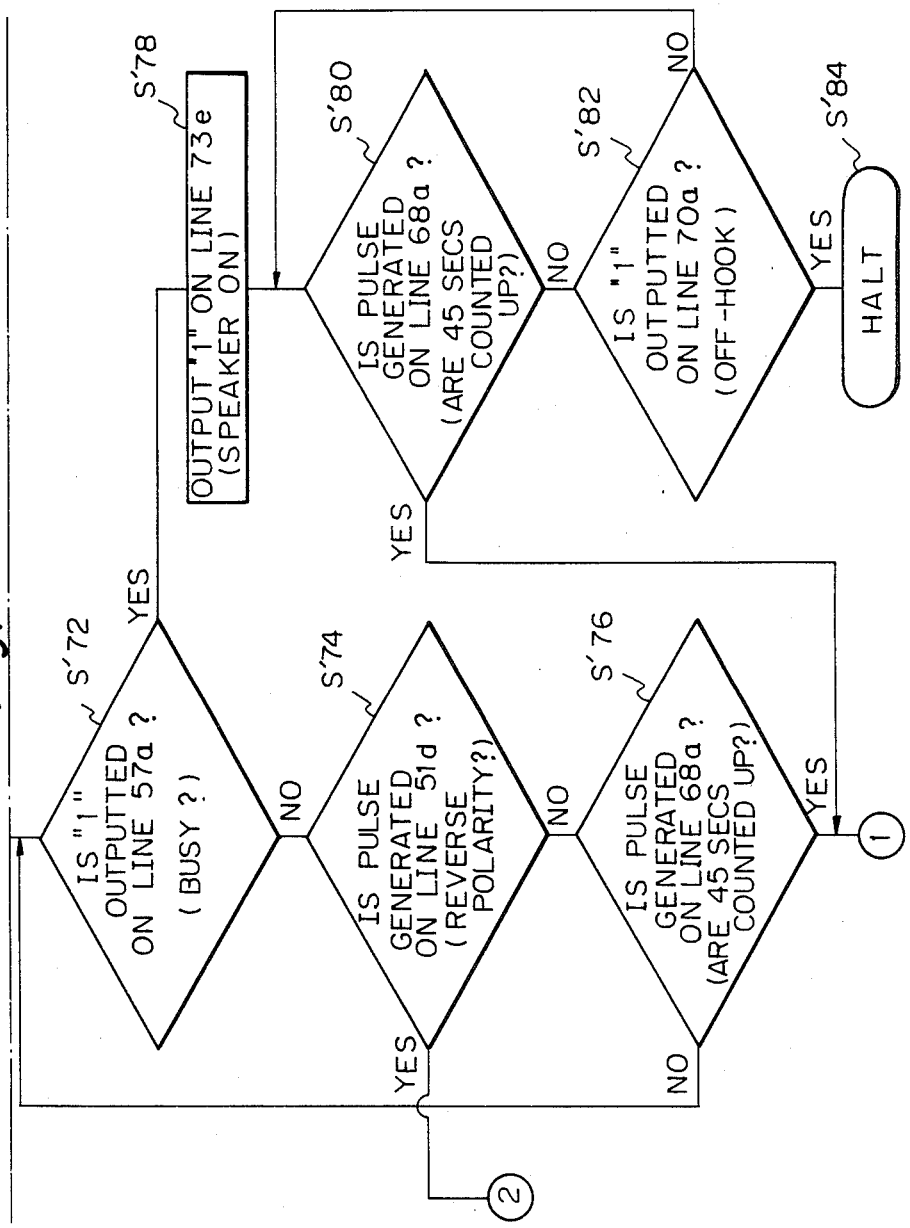
FIG. 5A, composed of FIGS. 5A-1 and 5A-2 to FIG. 5D, where
Figure 5B:
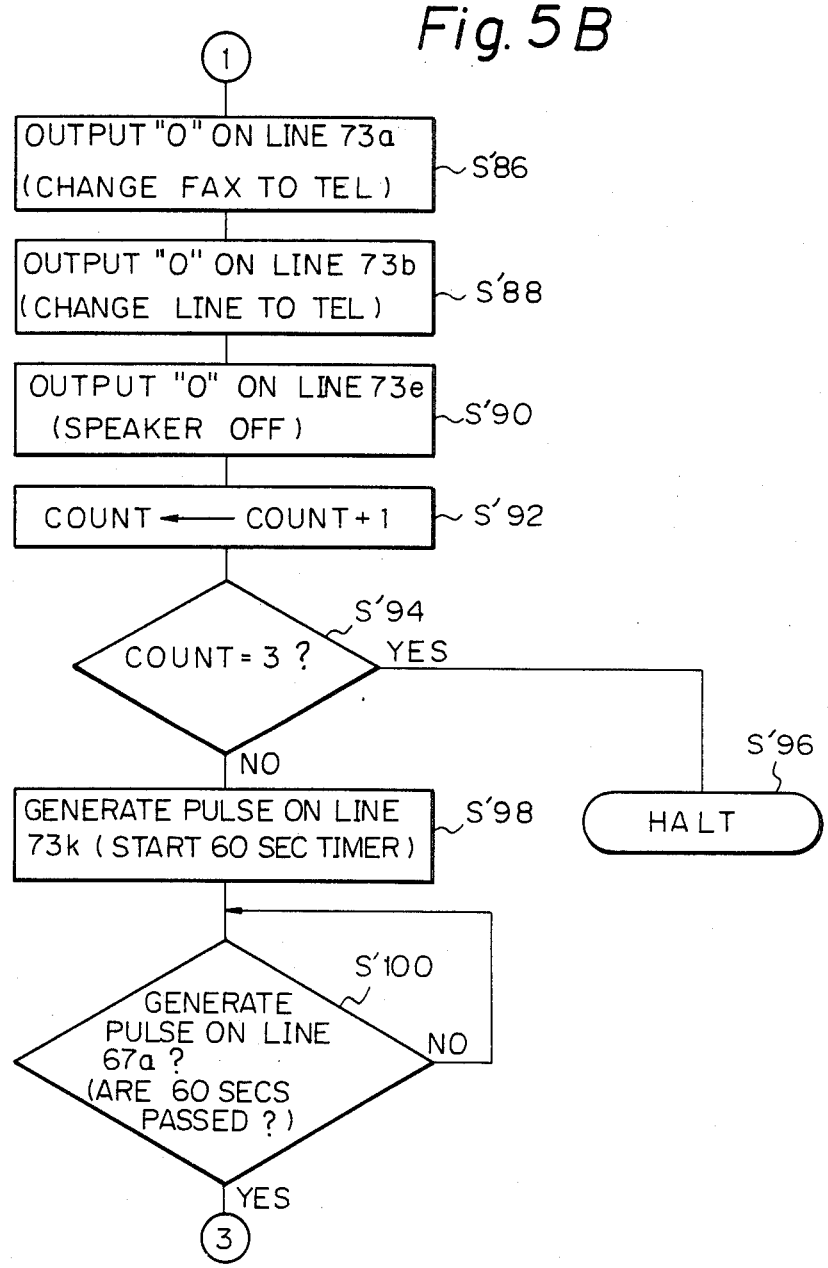
FIG. 5D is composed of FIGS. 5D-1 and 5D-2 are flow charts showing control procedures of a control circuit in the second embodiment.
Figures 2, 5C:
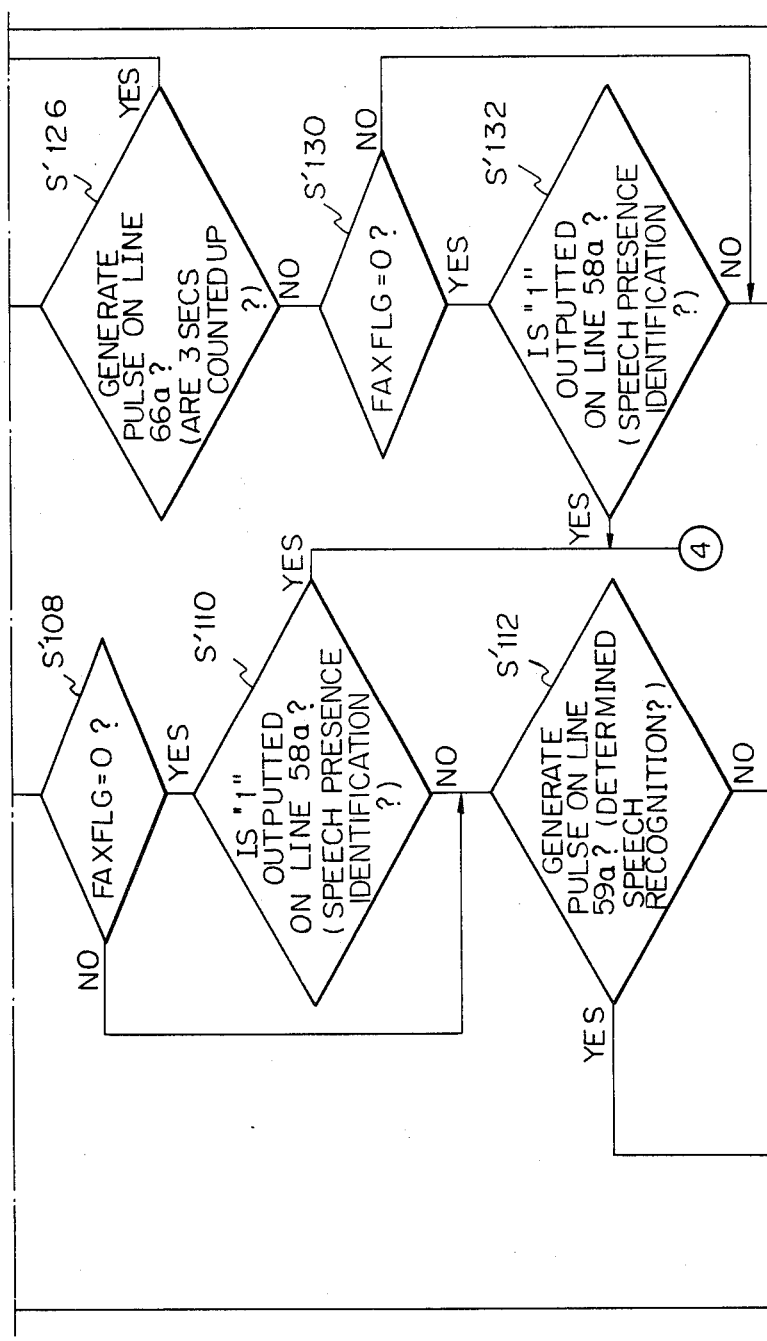
Figures 3, 5C:
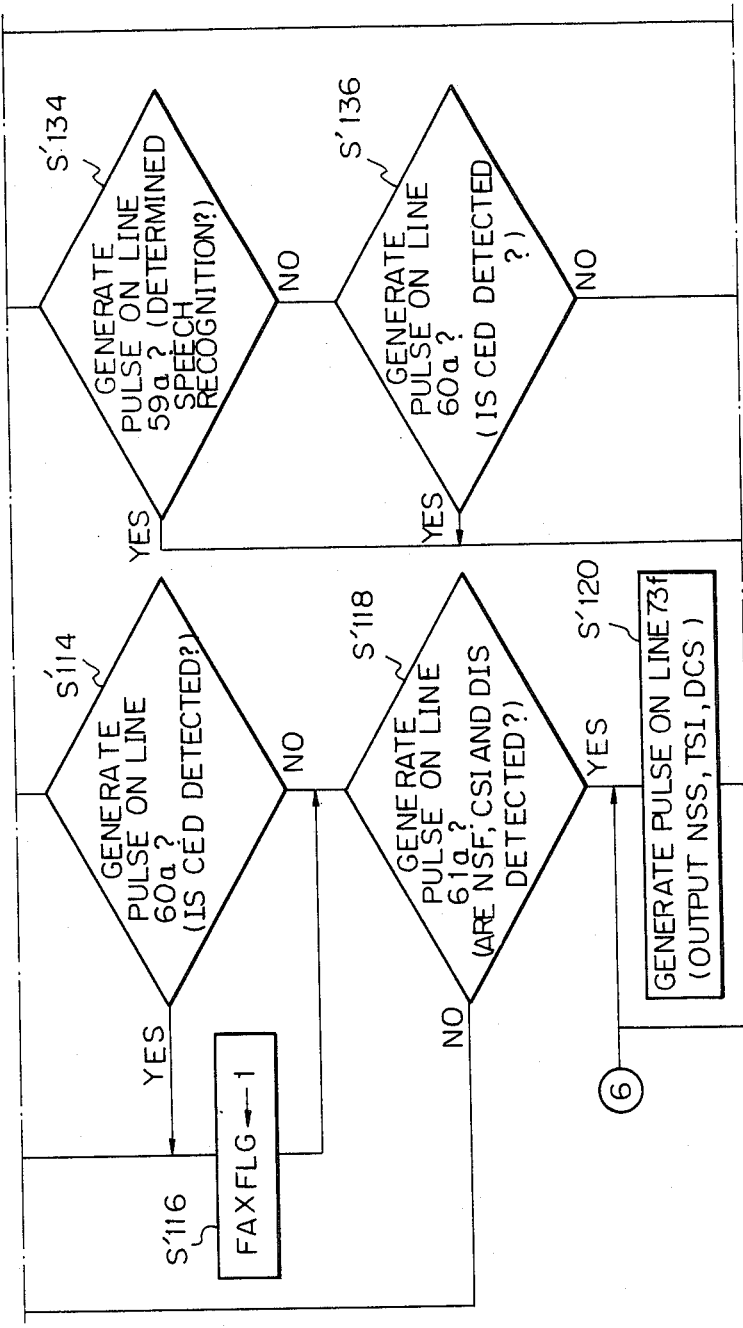
Figures 4, 5C:
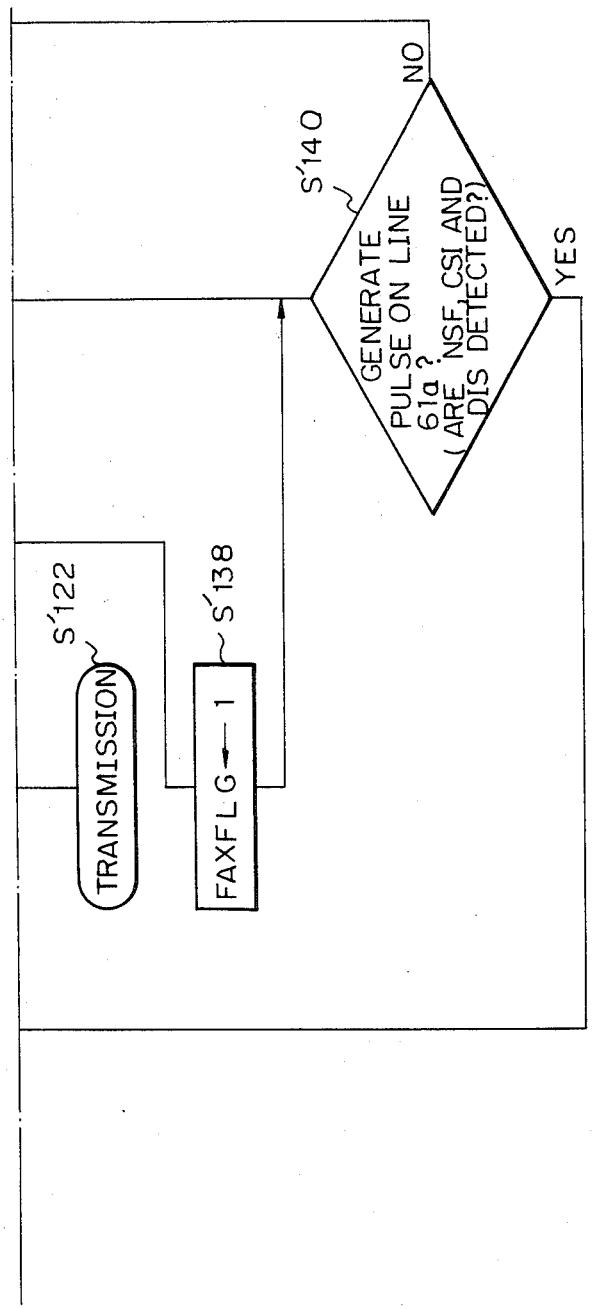

FIG. 4 shows a block diagram of the second embodiment of the facsimile machine. Numeral 51 denotes a NCU which is connected to a terminal of a line to allow a telephone network to be used for data communication and which controls the connection of the telephone network, switches a data communication line and retains a loop. The NCU 51 receives a signal through signal line 73a from control circuit 73 (FIG. 4B). If the signal level is "0", it connects a telephone line 51a to a signal line 51b of a telephone set 53. If the signal level on the signal line 73a is "1", the NCU 51 connects the telephone line 51a to the facsimile machine, that is, to an input signal line 51c of a hybrid circuit 55. In a normal state, the telephone line 51a is connected to the signal line 51b of the telephone set 53. When NCU 51 detects a polarity reversal of the signal on telephone line 51a, it produces a pulse on a signal line 51d.

The telephone set 53 is connected to the NCU 51 through a line changing circuit 52. This circuit connects signal line 51b from NCU 51 to either telephone set 53 through signal line 52a or calling circuit 54 through signal line 52b. The line changing circuit 52 connects the signal line 51b to the signal line 52a or 52b in response to the signal level "0" or "1" on a signal line 73b from control circuit 73.

Calling circuit 54 generates a calling signal under the control of signal lines 73c and 73d. When a pulse is produced on signal line 73c, calling circuit 54 closes a DC circuit and, after three seconds, receives dialing pulses from the signal line 73d and produces a corresponding selection signal on the signal line 52b. A function to detect a tone signal on the line after the closure of the DC circuit may be added.

An input/output terminal of the facsimile apparatus comprises a hybrid circuit 55 which separates a received signal from signal line 51c from a send signal from a signal line 65a. The send signal is combined in an adder circuit 65 and transmitted by the hybrid circuit 55 only to the signal line 51c. The received signal is applied to circuits 56, 57, 58, 59, 60 and 61 through signal line 55a.

The speaker circuit 56 is a speech output circuit controlled by a signal line 73e. When a signal level on the signal line 73e is "1", it outputs the received speech signal through a speaker. When the signal level is "0", it does not output the speech signal.

The tone detection circuit 57 detects a busy tone signal used in telephone communication, and when it detects a busy signal it produces a "1" signal on a signal line 57a.

The speech presence identification circuit 58 detects speech signals from an operator at the partner station when that operator orally responds. When it detects a speech signal, it generates a signal level of "1" on a signal line 58a.

A specified speech detection circuit 59 produces a pulse on a signal line 59a when it detects a specific speech such as "facsimile" or "facs" in the speech signal from the operator.

The CED signal detection circuit 60 detects a CED signal sent from a partner station. When it detects the CED signal, it produces a pulse on a signal line 60a.

The signal detection circuit 61 produces a pulse on a signal line 61a when it detects the series of signals NSF, CSI and DIS sent from a partner station.

Blocks 62, 63 and 64 are circuits in a sending unit. The signal send-out circuit 62 sends out signals NSS, TSI and DCS which correspond to the signals NSF, CSI and DIS, respectively. The send-out of those signals is started by the pulse input to the signal line 73f. The signals NSS, TSI and DCS are supplied to the adder circuit 65 through a signal line 62a and combined therein. When the signal send-out circuit 62 finishes the send-out of the signals, it produces a pulse on a signal line 62b.

The speech signal generating circuit 63 may comprise a speech synthesizer or a tape recorder and it supplies to a signal line 63a a speech message selected by the level of the signal applied to a signal line 73g in synchronism with a pulse generated on a signal line 73h. When the signal level on the signal line 73g is "0", it outputs a speech message: "Please continue speech communication until an operator responds". If the signal level is "1", it outputs a speech message: "Operator will respond. Please hold." At the end of the transmission of the speech message, a pulse is produced on a signal line 63b.

The CNG output circuit 64 supplies a CNG signal to a signal line 64a when a pulse is produced on a signal line 73i. At the end of the send-out of the signal, it produces a pulse on a signal line 64b.

A control circuit 73 comprises a microprocessor and a memory and controls the operation of the machine. The signal lines described above are connected to the control circuit 73. Timer circuits 66–69, an off-hook circuit 70, an auto-send command detection circuit 71 and a pseudo-bell sound-generating circuit 72 are connected to the control circuit 73.

The timer circuits 66–69 initiate timing when control circuit 73 supplies pulses to signal lines 73j, 73k, 73l and 73m, respectively, to count 3 seconds, 60 seconds, 45 seconds and 35 seconds, respectively, and produce pulses on signal lines 66a, 67a, 68a and 69a respectively, at the end of counting.

The off-hook detection circuit 70 detects whether the handset of the telephone set 53 is on the hook or off the hook. If it is on the hook, it produces a "0" signal and, if it is off the hook, it produces a "1" signal on a signal line 70a.

The facsimile machine of the present embodiment is equipped with known operator functions such as one-touch keys, memory dialing function and on-hook auto-send function by the keys. The auto-send command from the console is detected by the auto-send instruction detection circuit 71. When the instruction is detected a pulse is produced on a signal line 71a.

The pseudo-bell sound-generating circuit 72 comprises a speaker and an oscillator. When a pulse is produced on a signal line 73n, it generates a pseudo bell sound to call an operator. An indication to call the operator may be used instead of the pseudo-bell sound-generating circuit 72.

Referring to the flow charts depicted in FIGS. 5A to 5B, the control procedures of the control circuit are explained. In the second embodiment, the operator can be called by the pseudo-bell sound-generating circuit 72 or the speaker circuit 56. Controls in steps S'58, S'78, S'90, S'142, S'150. S'160 and S'166 are modified depending on the particular circuit used. Only one of the operator call circuits may be used or both circuits may be provided and selectively used under the control.

In steps S'50–S'58 of FIG. 5A, flags and the circuit blocks are initialized. In step S'50, a counter COUNT in the control circuit 73, which counts the number of times of call is reset to "0". In step S'52, the flag FAXFLG is reset to "0". FAXFLG indicates whether the partner terminal is a facsimile machine. In the step S'54, a "0" signal produced on signal line 73a causes NCU 51 to connect telephone line 51a to signal line 51b; that is, to the telephone set 53. In the step S'56, a "0" signal produced on signal line 73b causes the line changing circuit 52 to connect signal line 51b to signal line 52a. Thus, the telephone set 53 is connected to the terminal of the telephone line 51a. In the step S'58, a "0" signal is produced on signal line 73e to disable speaker circuit 56. When the pseudo-bell sound generating circuit 72 is used to call the operator, the "0" signal is produced on the signal line 73n.

After the above initialization, the machine stands by in step S'60. In the step S'60, a pulse input on the signal line 71a is monitored. That is, an auto-send instruction input is monitored. If it is inputted, steps S'62, S'64, S'66, S'68 and S'70 are executed.

In the step S'62, a "1" signal is produced on signal line 73b for the auto-send operation to cause line changing circuit 52 to connect signal line 51b to signal line 52b. Thus, calling circuit 54 is connected to NCU 51. In step S'64, dialing pulses from a console unit (not shown) are applied to calling circuit 54 through signal line 73d. In step S'66, a pulse is applied to calling circuit 54 through signal line 73c so that it outputs a selection signal corresponding to the input dialing pulses. Calling circuit 54 closes the DC circuit and outputs the selection signal after three seconds. In step S'68, a pulse produced on signal line 73l starts timer circuit 68 counting a 45-second call period. In step S'70, a signal level of "1" produced on signal line 73a connects telephone line 51a to the signal line 51c.

In a loop of steps S'72 to S'76, the signal levels on the signal lines 57a, 51d and 68a are checked. Step S'76 checks whether the 45-second call period has elapsed or not, and in the step S'72, the "1" signal on the signal line 57a responsive to the detection of the busy tone signal or, the pulse on the signal line 51d representing the polarity reversal in response to the response from the partner station is checked. If the partner station is busy in the step S'72, a step S'78 is executed, and if the response is detected in the stp S'74, a step S'102 in FIG. 5C is executed. If the elapse of the 45-second period is detected in the step S'76, a step S'86 in FIG. 5B is executed.

In the step S'78, a "1" signal is produced on the signal line 73e to cause the speaker circuit 56 to output the speech signal on the signal line 55a. When the pseudo-bell sound-generation circuit 72 is used to call the operator, a signal level "1" is produced on the signal line 73n to generate the pseudo-bell sound. In a step S'80, the time-out of the 45-second timer 68 is checked. If the 45-second period has not elapsed, step S'82 is executed, and if the 45 second period has been elapsed, step S'86 is executed.

Step S'82 checks whether or not the signal level on the signal line 70a is "1". As stated earlier at page 20, lines 6 through 10, a signal level of "1" on signal line 70a indicates that the handset of telephone set 53 is off the hook. When the handset is off the hook; i.e., the signal level is "1" on signal line 70a, the operation is stopped in step S'84. If telephone set 53 remains on-hook, the step S'80 is again executed.

FIG. 5B shows a method to control the number of operations of auto-send operation. In a step S'86, a "0" signal is produced on the signal line 73a causing NCU 51 to connect telephone line 51a to signal line 51b of the telephone set 53. In step S'88, a "0" signal is produced on signal line 73b causing line changing circuit 52 to connect signal line 51b to the signal line 52a of telephone set 53. In step S'90, a "0" signal is produced on signal line 73e to stop the speech output of speaker circuit 56. When pseudo-bell sound generating circuit 72 is used to call the operator, the "0" signal is produced on the signal line 73n to stop the bell sound of pseudo-bell sound generating circuit 72. In a step S'92, the counter COUNT which counts the number of times the auto-send operation is performed is incremented by one. Step S'94 checks whether the content of the counter is equal to 3. If count equals 3, the operation is stopped a step S'96. If count is not equal to 3 step S'98 is executed and a pulse is produced on the signal line 73k to start the one-minute timer circuit 67.

In step S'100, the signal level on the signal line 67a is checked to determine if the one-minute waiting time period has elapsed. If it has elapsed, step S'62 in FIG. 5A is again executed to reinitiate the auto-send operation.

If the polarity reversal of the signal on the line is detected in the step S'74 in FIG. 5A, it indicates the response by the partner station and a step S102 in FIG. 5C is executed. In the step S'102, a pulse is produced on the signal line 73m to start the 35-second timer circuit 69. In a step S'104, a pulse is produced on the signal line 73i to cause the CNG output circuit 64 to send out the CNG signal.

Step S'106 checks whether the pulse was produced on the signal line 64b, that is, whether the send-out of the CNG signal was completed or not. If the send-out is not completed, a step S'108 is executed, and if it has been completed, a step S'124 is executed.

Step S'108 checks whether the flag FAXFLG is "0" or not, that is, whether the partner terminal is a facsimile machine or not. If the partner terminal is a facsimile machine, step S'112 is executed. If it is a telephone set or other terminal, step S'110 is executed.

Figures 2, 5D:
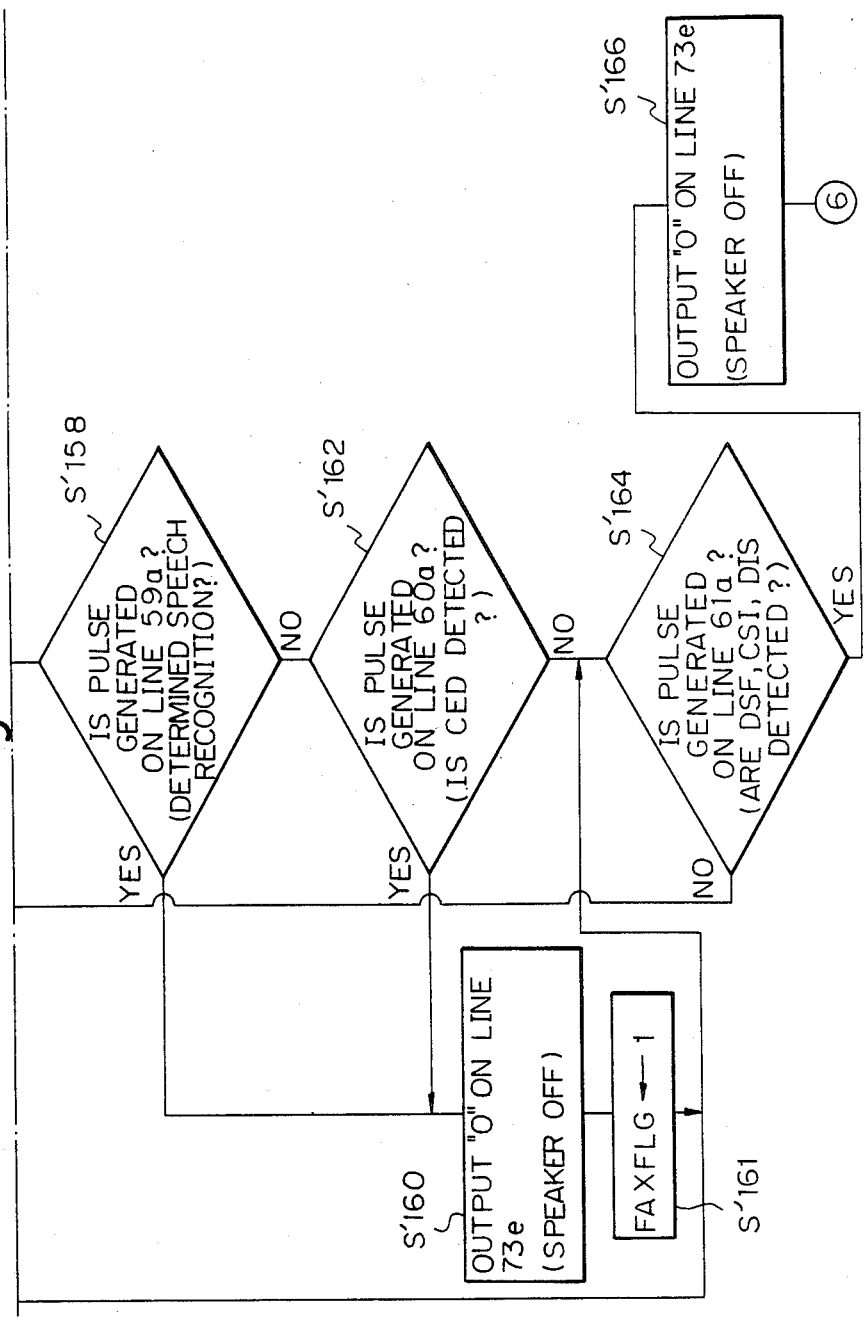

Step S'110 checks whether the signal level on the signal line 58a is "1" or not, that is, whether the speech presence identification circuit 58 detected speech signals or not. If the speech of the operator is detected, step S'142 in FIG. 5D is executed. If the speech is not detected, step S'112 is executed.

Step S'112 checks whether a pulse was produced on the signal line 59a, that is, whether the specific speech such as "facsimile" or facs" was detected.

Step S'114 checks if a pulse was produced on the signal line 60a. Such a pulse is generated, if the CED signal of the partner facsimile machine is detected.

If one of the decisions in the steps S'112 and S'114 is affirmative, it indicates that the partner facsimile machine responded or, at least, a facsimile machine in the manual receive mode is connected and facsimile communication is permitted. Thus, in a step S'116, the flag FAXFLG is set "1" and step S'118 is executed. If the facsimile communication is not permitted, the flag is not set but the step S'118 is executed.

Step S'118 checks whether the pulse was produced on the signal line 61a. Such a pulse is generated when the signals NSP, CSI and DIS sent from the partner facsimile machine are detected. If the signals are detected, step S'120 is executed, and if they are not detected, step S'106 is executed.

In step S'120, the signals NSS, TSI and DCS corresponding to the signals NSF, CSI and DIS, respectively, are produced on the signal line 73f and sent out of signal output circuit 62. In a step S'122, the known facsimile communication is carried out.

Returning to step S'106, if the transmission of the CNG signal has been completed, a pulse is produced on the signal line 73i in a step S'124 to start the 3-second timer 66. In a step S'126, the time-out of the timer circuit is checked, and if the 3-second interval has been elapsed, the elapse of the 35-second initial identification period is checked in a step S'128. If the 35-second initial identification period has not elapsed in the step S'128, the step S'104 is executed, repeating the send-out of the CNG signal at 3 second intervals. If the 35-second initial identification period has elapsed, a step S'146 of FIG. 5D is executed.

Until the 3-second interval is elapsed in the step S'126, a step S'130 is executed. In the step S'130, the flag FAXFLG is checked to determine if the partner station is a facsimile machine or not. If it is a facsimile machine, a step S'134 is executed, and if it is not a facsimile machine, a step S'132 is executed.

In the step S'132, the speech of the partner station is detected as is done in the step S'110. If speech is detected, a step S'142 in FIG. 5D is executed. If the speech is not detected, in step S'132 possibility of the facsimile communication is checked in steps S'134 and S'136 by the specific speech detection circuit 59 or the CED signal detection circuit 60 as is done in the steps S'112 and S'114. If the facsimile communication is permitted, the flag FAXFLG is set in the step S'138, and if it is not permitted, the flag is not set and a step S'140 is executed.

In the step S'140, the signals NSF, CSI and DIS are detected by the signal detection circuit 61 as is done in the step S'118. If the signals are detected, the step S'120 is executed, and if they are not detected, the step S'126 is executed.

In this manner, in FIG. 5C, the CNG signal is sent at the interval of three seconds for the 35-second initial identification period. During the send-out of the signal and the 3-second interval, the possibility of the facsimile communication is checked, and if the significant protocol signal is detected, the facsimile communication is effected. When the speech signal of the partner station is detected, that is, when the operator at the partner station responds through the telephone set, the control shown in FIG. 5D is effected.

In a step S'142 of FIG. 5D, a "1" signal is produced on the signal line 73e to cause the speaker circuit 56 to output the speech signal. Thus, the operator is called by the speech sound. If the psuedo-bell sound is used, the "1" signal is produced on the signal line 73n to activate the pseudo-bell sound generating circuit 72.

In a step S'144, whether the pulse was produced on the signal line 69a or not, that is, whether the 35-second timer circuit 69 timed out or not is checked, to determine whether the initial identification period has been elapsed or not. If it has been elapsed, a step S'146 is executed and if it has not been elapsed, a step S'153 is executed.

In the steps S'146–S'150, initialization before the end of operation is carried out "0" signals are produced on the signal lines 73a, 73b and 73e to connect the telephone line 51a to the telephone set, disconnect the calling signal circuit 54 from the line selection circuit 52 and disable the speaker circuit 56. When the pseudo bell sound is used to call the operator, a "0" signal is produced on the signal line 73n in a step S'150 to disable the pseudo bell sound generation circuit 72. Then, the process is stopped in a step S'152.

In a step S'153, whether the flag FAXFLG is "0" or not, that is, whether the partner machine is a facsimile machine or not is checked. If it is not the facsimile machine, a step S'154 is executed, and if it is the facsimile machine, a step S'164 is executed.

In the step S'154, whether the signal level on the signal line 70a is "1" or not is checked to determine the response of the operator. If the operator picked up the handset of the telephone set 53, the telephone line 51a is connected to the telephone set 53 in a step S'156 to allow the speech communication between the operators. If the handset is kept on the hook, a step S'158 is executed.

In the step S'158, whether the pulse was produced on the signal line 59a or not, that is, whether the specific speech such as "facsimile" or "facs" was detected or not is checked. In a step S'162, whether the pulse was produced on the signal line 60a or not, that is, whether the CED signal of the partner station was detected or not is checked. If one of the decisions in the steps S'158 and S'162 is affirmative, it indicates that the partner station is the facsimile machine. Thus, a step S'160 is executed and the "0" signal is produced on the signal line 73e (or signal line 73n) to disable the speaker circuit 56 (or pseudo-bell sound generating circuit 72). Then, the flag FAXFLG is set in a step S'161 and then a step S'164 is executed.

In the step S'164, whether the pulse was produced on the signal line 61a or not, that is, whether the signals NSF, CSI and DIS of the partner facsimile machine were detected or not is checked. If the signals were detected, a step S'166 is executed, and if they were not detected, the step S'144 is executed. In the step S'166, the "0" signal to produced on the signal line 73e or 73n to disable the speaker circuit 56 or the pseudo-bell sound generating circuit 72, and then the step S'120 (FIG. 5C-3) is executed. Then, the facsimile communication is carried out.

In this manner, in the auto-send mode, the protocol signal or speech signal sent from the receiving station is detected to effect the facsimile communication or the speech communication by the telephone set in accordance with the detected signal. Thus, the line connection is effectively utilized. When the operator at the receiving station responds, the speech is outputted or the pseudo bell sound is generated to call the operator at the sending station. Accordingly, the speech communication between the operators is attained so long as the operators are in the vicinities of the machines. Even if the receiving station responds by speech, the protocol signal can be detected if the specific speech such as "facsimile" is detected in the speech. Thus, the effective utilization of the line is attained. Further, since the control instruction can be given to the operator at the receiving station by the speech signal generation means, an appropriate operation may be requested to the operator.

In the above embodiment, the instruction to the operator at the receiving station by speech is effected only when the call to the operator is required. It may also be used to inform the operator of other instructions such as manual switching of the telephone set and the facsimile machine.

While the facsimile machine is described in the second embodiment, the present invention may be applied to other data communication apparatus which use the telephone line.

A third embodiment which is a modification of the second embodiment is now explained.

Figures 6, 6A:
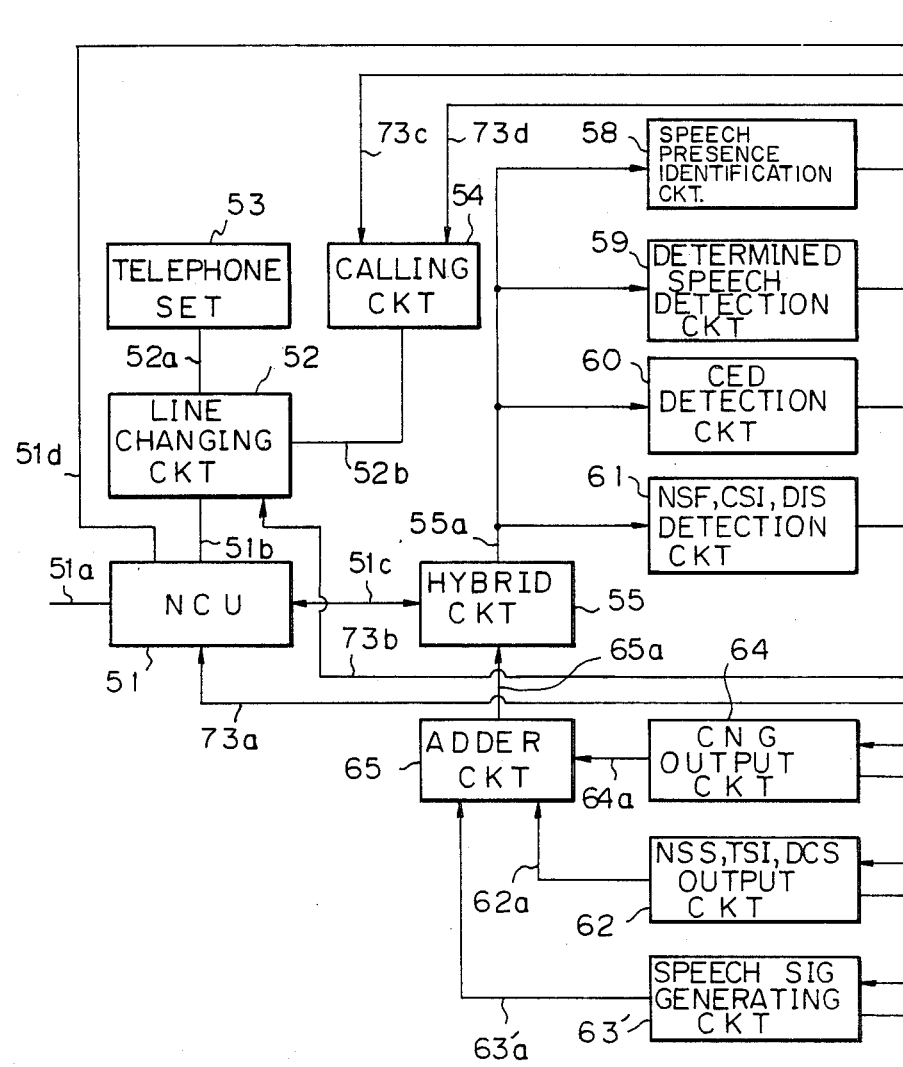
FIG. 6, composed of FIGS. 6A and 6B is a block diagram of a third embodiment.
Figure 6B:
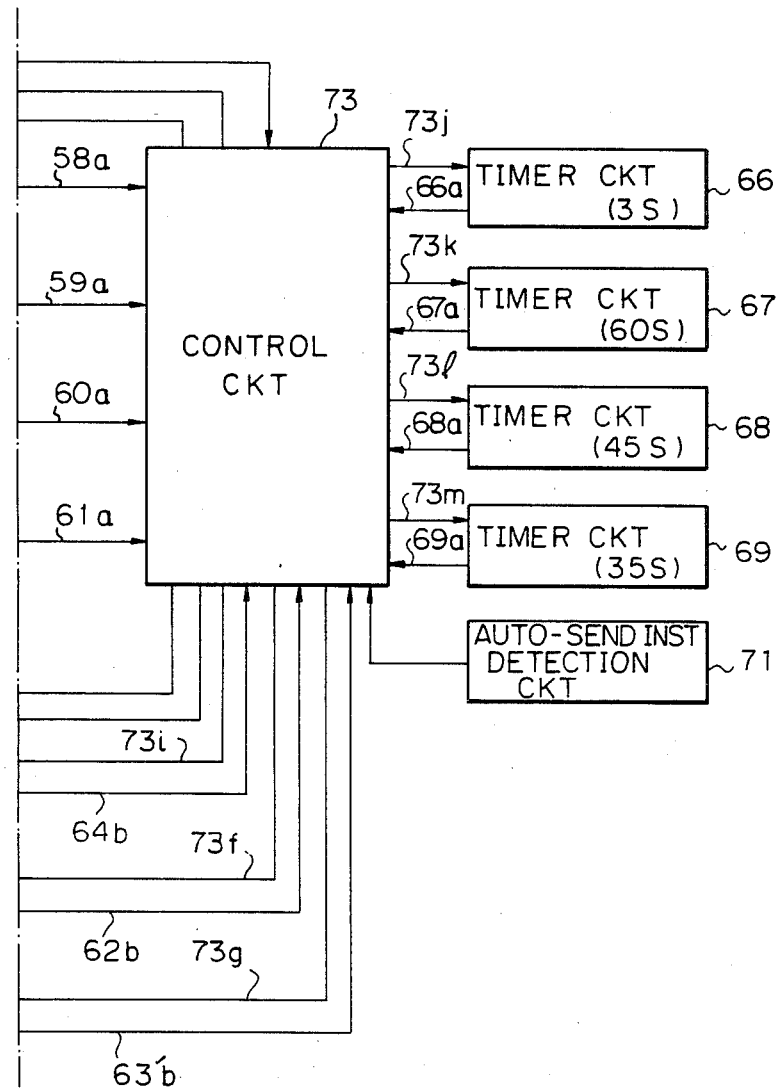

FIG. 6 is a block diagram of the third embodiment of the facsimile machine. The like blocks to those shown in FIG. 4 are designated by the like numerals and the explanation thereof is omitted.

A speech signal generating circuit 63' may comprise a speech synthesizer or a tape recorder and sends out a speech message to a signal line 63'a in synchronism with a pulse produced on a signal line 73g. The speech message instructs the selection of the facsimile communication path when the facsimile machine at the receiving station is in the manual mode and the operator responds. For example, it may be "Depress receive (send) button". The speech signal generating circuit 63' produces a pulse on a signal line 63'b when it sends out the speech signal.

Figures 2, 7A:
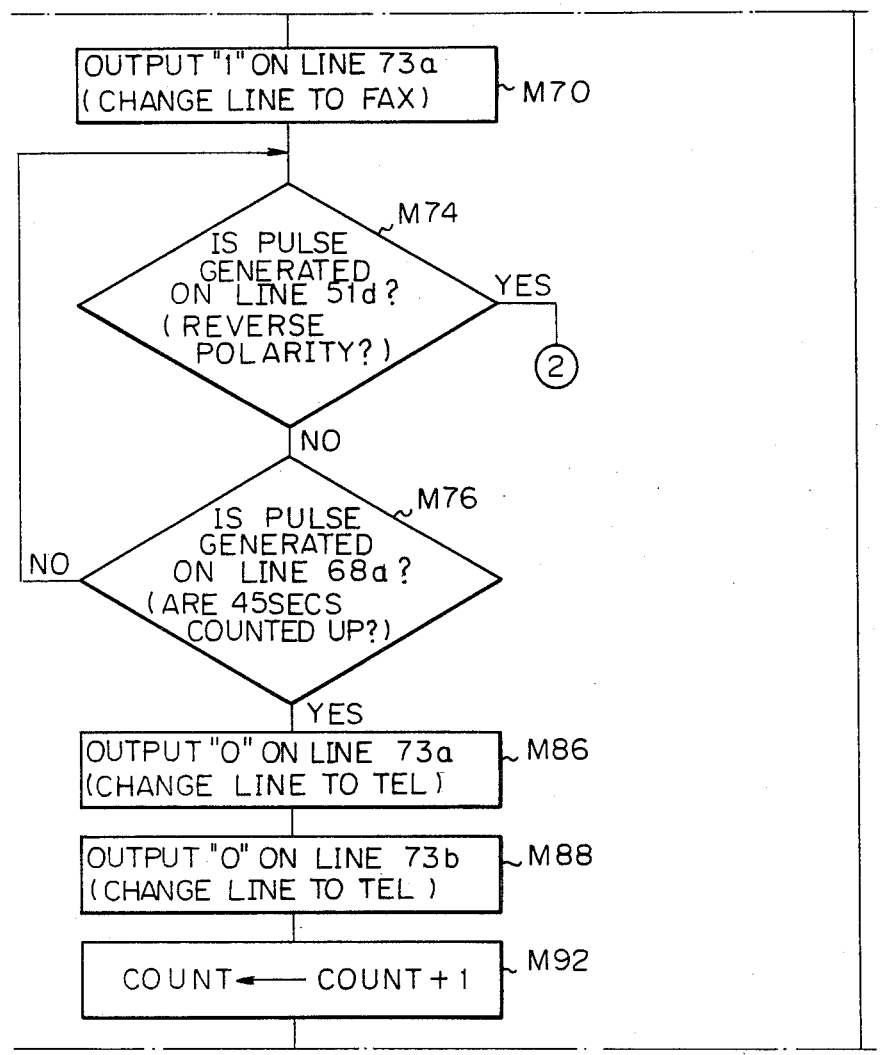
FIG. 7A, composed of FIGS. 7A-1, 7A-2 and 7A-3 and FIG. 7B composed of FIGS. 7B-1, 7B-2, 7B-3 and 7B-4 are flow charts showing control procedures of a control circuit in the third embodiment.
Figures 3, 7A:
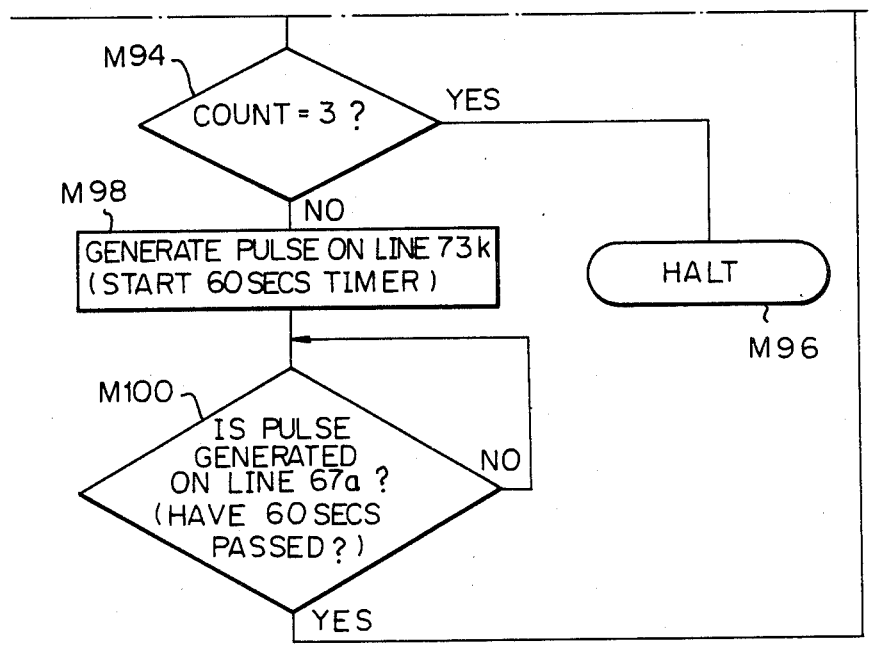
Figures 3, 7B:
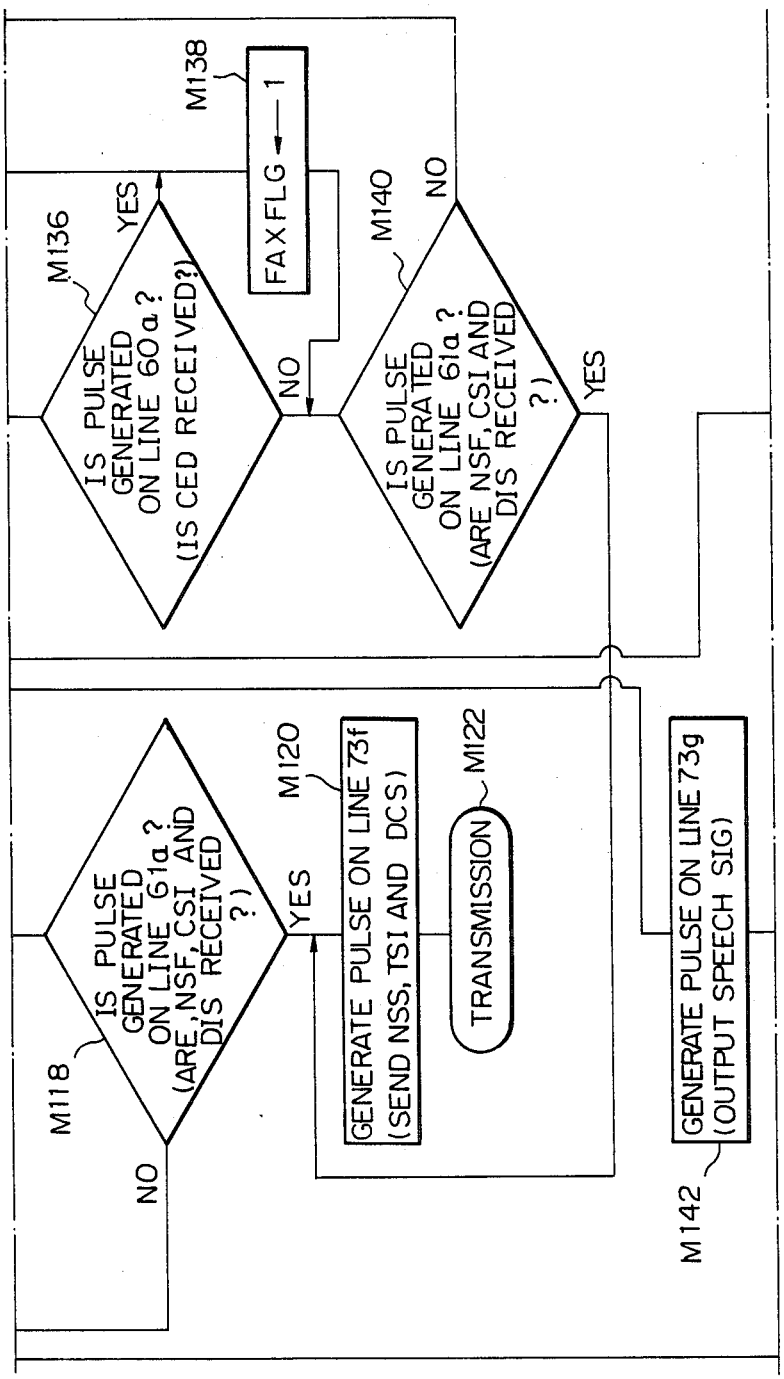
Figures 4, 7B:
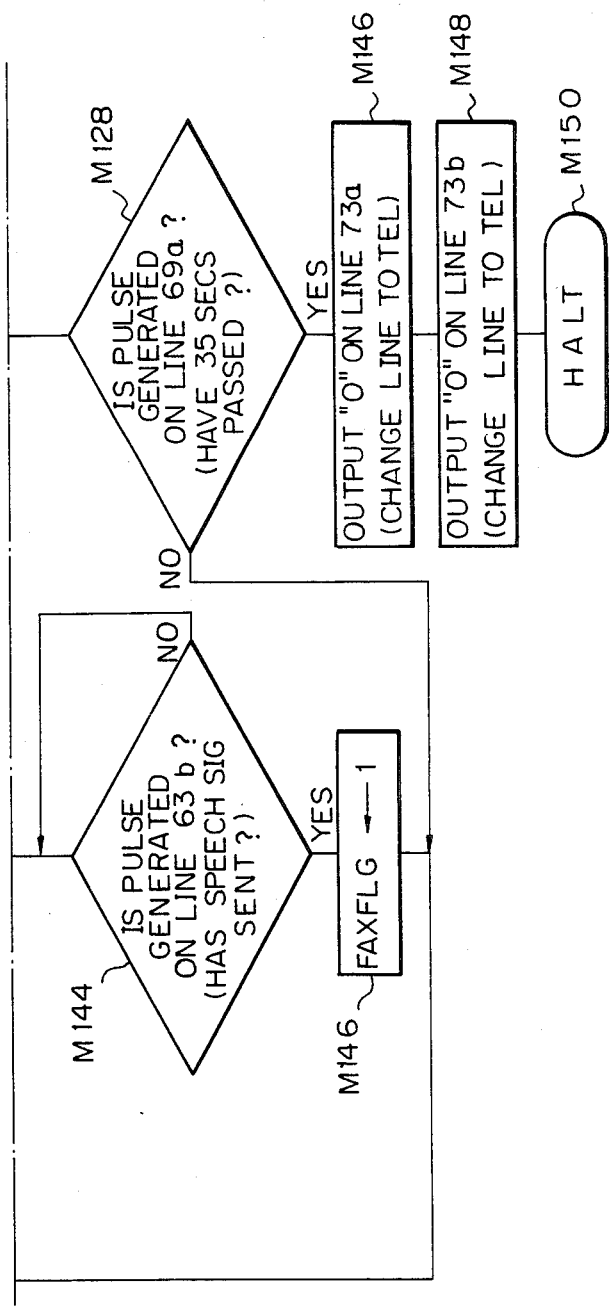

Referring to flow charts of FIGS. 7A and 7B, the control procedures of the control circuit 73 of the third embodiment are explained. In steps M50–M56 of FIG. 7A, flags and the blocks are initialized. In the step M50, a counter COUNT (in the control circuit 73) which counts the number of times the destination station is called is reset to "0". In the step M52, a flag FAXFLG which indicates whether the receiving station terminal is a facsimile machine or not is reset to "0". In the step M54, a "0" signal is produced on the signal line 73a to cause the NCU 51 to connect the telephone line 51a to the signal line 51b, that is, to the telephone set 53. In the step M56, a "0" signal is produced on the signal line 73b to cause the line changing circuit 52 to connect the signal line 51b to the signal line 52a. Thus, the telephone set 53 is connected to the terminal of the telephone line 51a.

After the initialization steps described above, the system stands by in a step M60. In the step M60, the application of a pulse on the signal line 71a is monitored. The auto-send command input is monitored, and if it is inputted, the control in a step M62 is executed. In the step M62, a "1" signal is produced on a signal line 73b to start the auto-send operation to cause the line changing circuit 52 to connect the signal line 51b to the signal line 52b. Thus, the calling circuit 54 is connected to the NCU 51.

In the step M64, the dialing pulses applied from the console panel (not shown) are supplied to the calling circuit 54 through the signal line 73d. In a step M66, a pulse is applied to the calling circuit 54 through the signal line 73c to produce a selection signal corresponding to the input dialing pulses. Thus, the calling circuit 54 closes the DC circuit and outputs the selection signal after three seconds. In a step M68, a pulse is produced on the signal line 73l to start the timer circuit 68. Thus, the counting of the 45-second call period is started. In a step M70, a "1" signal is produced on the signal line 73a to connect the telephone line 51a to the signal line 51c.

In a loop of steps M74 and M76, the levels of the signal lines 51d and 68a are checked. In the step M74, whether the 45-second call period has been elapsed or not is checked and a pulse on the signal line 51d indicating the polarity reversal in response to the response by the receiving station is checked. If the response is detected in the step M74, a step M102 in FIG. 7B is executed. If the elapse of the 45-second period is detected in the step M74, a step M86 is executed.

The steps M86–M100 are control of the number of times the auto-send operation is performed. In a step M86, a "0" pulse is produced on the signal line 73a to cause the NCU 51 to connect the telephone line 51a to the signal line 51b of the telephone set 53. In a step M88, a "0" signal is produced on the signal line 73b to cause the line changing circuit 52 to connect the signal line 51b to the signal line 52a of the telephone set 53. In a step M92, the counter COUNT which counts the number of times of auto-send operation is incremented by one. In a step M94, whether the content of the counter is equal to 3 or not is checked. If the decision is affirmative, it indicates that the auto-send operation has been carried out three times and the operation is stopped in a step M96. If the decision is negative, a step M98 is executed to produce a pulse on the signal line 73k to start the one-minute timer circuit 67. In a step M100, the level of the signal line 67a is checked to determine whether the one-minute waiting period has been elapsed or not. If it has been elapsed, the step M62 is again executed to carry out the auto-send operation. The above steps are repeated.

If the polarity reversal of the signal on the line is detected in the step M74, it indicates the response by the receiving station and a step M102 in FIG. 7B is executed. In the step M102, a pulse is produced on the signal line 73m to start the 35-second timer circuit 69. In a step M104, a pulse is produced on the signal line 73i to cause the CNG output circuit 64 to send CNG signal. In a step M106, whether the pulse was produced on the signal line 64b or not, that is, whether the send-out of the CNG signal has been completed or not is checked. If the send-out has not been completed, a step M108 is executed, and if it has been completed, a step M124 is executed.

In the step M108, whether the flag FAXFLG is "0" or not, that is, whether the receiving terminal is the facsimile machine or not is checked. If the receiving terminal is the facsimile machine, a step M112 is executed, and if it is other terminal such as telephone set, a step M110 is executed. In the step M110, whether the signal level on the signal line 58a is "0" or not, that is, whether the speech signal of the receiving station is detected by the speech presence identification circuit 58 or not is checked. If the speech of the operator at the receiving station is detected, a step M142 is executed. If the speech is not detected, a step M112 is executed. In the step M112, whether the pulse was produced on the signal line 59a or not, that is, whether the specific speech such as "facsimile" or "facs" was detected or not is checked. In a step M114, whether the pulse was produced on the signal line 60a or not, that is, whether the CED signal of the receiving station facsimile machine was detected or not is checked if one of the decisions in the steps M112 and M114 is affirmative, it indicates that the receiving station facsimile machine responds or the facsimile machine in the manual receive mode is connected and the facsimile communication is permitted. Thus, the flag FAXFLG is set in a step M116 and a step M118 is executed. If the facsimile communication is not permitted, the flag is not set and the step M118 is executed.

In the step M118, whether the pulse was produced on the signal line 61a or not, that is, whether the signals NSF, CSI and DIS sent from the receiving station facsimile machine were detected or not is checked. If those signals were received, a step M120 is executed, and if they were not detected, the step M106 is executed.

In the step M120, signals NSS, TSI and DCS for the signals NSF, CSI and DIS are produced on the signal line 73f by the NSS, TSI and DCS output circuit 62. In a step M122, the facsimile communication is effected.

If the CNG signal has been sent, a pulse is generated on the signal line 73i in a step M124 to start the 3-second timer circuit 66. In a step M126, the time-out of the timer circuit 66 is checked, and if the 3-second interval has elapsed, the time-out of the 35-second initial identification period started in the step M128 is checked. If the 35-second initial identification period has not elapsed in the step M128, the step M104 is executed to repeat the send-out of the CNG signal at an interval of three seconds. If the initial identification period has elapsed, a step M146 is executed.

Before the end of the 3-second interval at the step M126, a step M130 is executed during this interval. In the step M130, the flag FAXFLG is checked to determine whether a receiving station is the facsimile machine or not as was done in the step M108. If the receiving station is the facsimile machine, a step M134 is executed, and if it is not the facsimile machine, a step M132 is executed. In the step M132, the speech from the receiving station is checked as was done in the step M110. If the speech of the operator at the receiving station is detected, a step M142 is executed. If the speech is not detected, whether the facsimile communication is permitted or not is checked by the CED signal detection circuit 60 and the specified speech detection circuit 59 in steps M134 and M136 as was done in the steps M112 and M114. If the facsimile communication is permitted, the flag FAXFLG is set in a step M138, and if it is not permitted, the flag is not set and a step M140 is executed. In the step M140, the signals NSF, CSI and DIS are detected by the NSS, TSI and DCS detection circuit 61 as was done in the step M118. If those signals are detected, a step M120 is executed, and if they are not detected, the step M126 is executed.

In this manner the CNG signal is sent at the interval of three seconds during the 35-second initial identification period and whether the facsimile communication is permitted or not is checked during the 3-second interval, and if the significant protocol signal is detected, the facsimile communication is effected. If the speech of the receiving station is detected, that is, if the operator responds by the telephone set, a step M142 is executed.

In the step M142, a pulse is produced on the signal line 73g to cause the speech signal generating circuit 63 to output speech such as "Depress receive button (or send button if the image is to be received)" to the operator at the receiving station. Then, in a step M144, a pulse is produced on the signal line 63b' to stand by the termination of the speech output. At the end of the speech output, the flag FAXFLG is set in a step M146 to prepare for the switching to the facsimile machine at the receiving station.

On the other hand, in the steps M146 and M148, the initialization before the termination of the operation is carried out. "0" signals are produced on the signal line 73a and 73b to connect the telephone line 51a to the telephone set and disconnect the calling signal circuit 54 from the line selector 52. Then, the process is stopped in a step M150.

In this manner, in the auto-send mode, the protocol signal and the specified speech signal sent from the receiving station are detected and appropriate instruction is given to the operator at the receiving station to assure that the facsimile communication is effected even if the receiving station is in the manual mode so that the line connection can be effectively utilized. If the receiving station responds by speech and the specific speech such as "facsimile" is detected in the speech, the protocol signal is detected so that the line can be effectively utilized. Since the control instruction is given to the operator at the receiving station by the speech signal generation means, appropriate operation by the operator at the receiving station can be instructed.

The instruction to the operator at the receiving station by the speech is not limited to the receive and send operations of the image but other instructions may be given.

While the facsimile machine is described in the third embodiment, the present invention may be applied to other data communication apparatus which uses the telephone line such as a telex machine.

As described hereinabove, in accordance with the present invention, in the communication apparatus which has the speech communication mode and the data communication mode and communicates through the telephone line, the data communication and the speech communication can be effected irrespective of the mode of the communication apparatus and the telephone line can be effectively utilized.

While the facsimile machine is described in the first, second and third embodiments, the present invention is not limited to the facsimile machine but it is applicable to the communication apparatus which has the speech communication mode and the data communication mode and communicates through the telephone line.

I claim:

1. A communication apparatus comprising:
   auto-communication means for automatically communicating data;
   speech communication means for communicating speech data;
   selection means for selecting said auto-communication means or said speech communication means and for setting said communication apparatus in an auto-communication mode or a speech communication mode, respectively;
   speech presence identification means for identifying when speech is sent from a destination station; and
   speech output means for outputting the speech sent from the destination station in accordance with an output of said speech presence identification means when said communication apparatus is in the auto-communication mode.

2. A communication apparatus according to claim 1 wherein said speech communication means is a telephone set and said communication apparatus further comprises off-hook detection means for detecting an off-hook state of said telephone set, said communication apparatus being set to the speech communication mode by said selection means when said off-hook detection means detects the off-hook state after said speech output means outputted the speech.

3. A communication apparatus according to claim 1 wherein said speech output means is a speaker for outputting the speech sent from the destination station.

4. A communication apparatus according to claim 1 wherein said auto-communication means is auto-receive means for automatically receiving data.

5. A communication apparatus according to claim 1 wherein said auto-communication means is auto-send means for automatically sending data.

6. A communication apparatus according to claim 1 wherein said auto-communication means performs facsimile communication.

7. A communication apparatus comprising:
   auto-communication means for automatically communicating data;
   speech communication means for communicating speech data;

selection means for selecting said auto-communication means or said speech communication means and for setting said communication apparatus in an auto-communication mode or a speech communication mode, respectively;

speech presence identification means for identifying when speech is sent from a destination station; and signal means for signalling when speech has been identified in accordance with an output of said speech presence identification means when said communication apparatus is in the auto-communication mode.

8. A communication apparatus according to claim 7 further comprising specified speech detection means, wherein a signal by said signal means is inhibited when said specified speech detection means detects predetermined speech.

9. A communication apparatus according to claim 7 wherein said signal means is a pseudo bell sound generation circuit.

10. A communication apparatus according to claim 7 wherein said auto-communication means is auto-receive means for automatically receiving data.

11. A communication apparatus according to claim 7 wherein said auto-communication means is auto-send means for automatically sending data.

12. A communication apparatus according to claim 7 wherein said auto-communication means performs a facsimile communication.

13. A communication apparatus according to claim 7 wherein said speech communication means is a telephone set.

14. A communication apparatus comprising:
auto-communication means for automatically communicating data;
speech communication means for communicating speech data;
selection means for selecting said auto-communication means or said speech communication means and for setting said communication apparatus in an auto-communication mode or a speech communication mode, respectively;
specified speech detection means for detecting specified speech sent from a destination station; and
speech signal output means for sending a predetermined speech signal in accordance with an output of said specified speech detection means when said communication apparatus is in said auto-communication mode.

15. A communication apparatus according to claim 14, wherein the predetermined speech signal is an instruction issued to the destination station.

16. A communication apparatus according to claim 14 wherein said auto-communication means is auto-send means for automatically sending data.

17. A communication apparatus according to claim 14 wherein said speech communication means is a telephone set.

18. A communication apparatus according to claim 14 wherein said auto-communication means performs a facsimile communication.

19. A communication apparatus according to claim 14 further comprising speech presence identification means for identifying when speech is sent from the destination station, and signal means for signalling when speech has been identified in accordance with an output of said speech presence identification means, wherein said signal means signals when said speech presence identification means identifies the speech sent from the destination station, and said signal means does not signal but said speech signal output means sends the predetermined speech signal, when said specified speech detection means detects the specified speech.

20. A communication apparatus according to claim 19 wherein said signal means is a pseudo bell sound generation circuit.

21. A communication apparatus comprising:
auto-send means for automatically sending data;
speech communication means for communicating speech data;
selection means for selecting said auto-send means or said speech communication means and for setting said communication apparatus in an auto-send mode or a speech communication mode, respectively;
discrimination means for discriminating speech signals from data signals sent from a destination station; and
speech output means for outputting speech sent from the destination station in accordance with an output of said discrimination means when said communication apparatus is in said auto-send mode.

22. A communication apparatus according to claim 21 wherein said auto-send means performs a facsimile communication.

23. A communication apparatus according to claim 21 wherein said speech output means is a speaker.

24. A communication apparatus according to claim 21 wherein said speech communication means is a telephone set.

* * * * *

UNITED STATES PATENT AND TRADEMARK OFFICE
CERTIFICATE OF CORRECTION

PATENT NO. : 4,815,121
DATED : March 21, 1989
INVENTOR(S) : TAKEHIRO YOSHIDA

Page 1 of 4

It is certified that error appears in the above-identified patent and that said Letters Patent is hereby corrected as shown below:

AT [57] ABSTRACT

Line 9, "a" should be deleted.
Line 10, "and speech" should read --and a speech--.

SHEET 6 OF 28

Fig. 3A-3, "OUTOPUTTED" should read --OUTPUTTED--.

COLUMN 1

Line 29, "sets" should read --set--.
Line 52, "NSF CSI" should read --NSF, CSI--.
Line 68, "35 second," should read -- 35 seconds,--.

COLUMN 2

Line 15, "call" should read --call,--.
Line 51, "3A-3" should read --3A-3,--.
Line 60, "5D-2" should read --5D-2,--.
Line 62, "6B" should read --6B,--.
Line 64, "7A-3" should read --7A-3,--.
Line 66, "7B-4" should read --7B-4,--.

COLUMN 4

Line 50, "the line" should read --the line.--.

UNITED STATES PATENT AND TRADEMARK OFFICE
CERTIFICATE OF CORRECTION

PATENT NO. : 4,815,121
DATED : March 21, 1989
INVENTOR(S) : TAKEHIRO YOSHIDA

It is certified that error appears in the above-identified patent and that said Letters Patent is hereby corrected as shown below:

COLUMN 5

Line 26, "step S6U," should read --step S60,--.
    Line 27, "in" should read --is--.
    Line 36, "signal time 30b." should read
          --signal line 30b.--.
    Line 48, "the" should be deleted.

COLUMN 6

Line 12, "Step 102" should read --Step S102--.
    Line 31, "step S110," should read --step S110--.
    Line 50, "the who" should read --the operator who--.

COLUMN 8

Line 44, "tected" should read tected,--.
    Line 56, "S'150." should read --S'150,--.

COLUMN 9

Line 6, "sound generating" should read
          --sound-generating--.
    Line 33, "signal" should read --signal,--.
    Line 34, "or," should read --or--.
    Line 38, "stp S'74," should read --step S'74,--.
    Line 47, "pseuodo-bell" should read --pseudo-bell--.
    Line 50, "45 second period has been elapsed," should read
          --45-second period has elapsed,--.
    Lines 53-54, "page 20, lines 6 through 10," should read
          --column 8, lines 33 through 37,--.

UNITED STATES PATENT AND TRADEMARK OFFICE
CERTIFICATE OF CORRECTION

PATENT NO. : 4,815,121
DATED : March 21, 1989
INVENTOR(S) : TAKEHIRO YOSHIDA          Page 3 of 4

It is certified that error appears in the above-identified patent and that said Letters Patent is hereby corrected as shown below:

COLUMN 10

Line 8, "a" should read --in--.
Line 9, "3" should read --3,--.
Line 19, "step S102" should read --step S'102--.
Line 43, "facs"" should read --"fax"--.
Line 45, "generated," should read --generated--.
Line 57, "NSP," should read --NSF,--.

COLUMN 11

Line 2, "been" should be deleted.
Line 18, "the" should be deleted.
Line 19, "detected, in step S'132" should read
         --detected in step S'132, the--.
Line 51, "been" should be deleted.
Line 52, "been" should be deleted.
Line 53, "been" should be deleted.
Line 56, "out 'O'" should read --out. "O"--.
Line 64, "generation" should read --generating--.

COLUMN 12

Line 31, "to" should read --is--.

COLUMN 13

Line 55, "been" should be deleted.

UNITED STATES PATENT AND TRADEMARK OFFICE
CERTIFICATE OF CORRECTION

PATENT NO. : 4,815,121

DATED : March 21, 1989

INVENTOR(S) : TAKEHIRO YOSHIDA

It is certified that error appears in the above-identified patent and that said Letters Patent is hereby corrected as shown below:

COLUMN 14

Line 12, "been" should be deleted.
    Line 13, "been" should be deleted.
    Line 47, "checked if" should read --checked. If--.

COLUMN 15

Line 52, "signal line" should read --signal lines--.
    Line 54, "calling signal circuit 54" should read --calling circuit 54--.
    Line 55, "line selector 52." should read --line changing circuit 52.--.

Signed and Sealed this

Thirtieth Day of April, 1991

Attest:

HARRY F. MANBECK, JR.

Attesting Officer

Commissioner of Patents and Trademarks